(12) United States Patent
Miller et al.

(10) Patent No.: US 7,214,749 B2
(45) Date of Patent: May 8, 2007

(54) CATALYST SYSTEM FOR HIGH ACTIVITY AND STEREOSELECTIVITY IN THE HOMOPOLYMERIZATION AND COPOLYMERIZATION OF OLEFINS

(75) Inventors: Stephen A. Miller, College Station, TX (US); Levi J. Irwin, College Station, TX (US)

(73) Assignee: The Texas A&M University Systems, College Station, TX (US)

( * ) Notice: Subject to any disclaimer, the term of this patent is extended or adjusted under 35 U.S.C. 154(b) by 0 days.

(21) Appl. No.: 11/176,723

(22) Filed: Jul. 7, 2005

(65) Prior Publication Data

US 2006/0025299 A1 Feb. 2, 2006

Related U.S. Application Data

(60) Provisional application No. 60/586,570, filed on Jul. 9, 2004.

(51) Int. Cl.
*C08F 4/76* (2006.01)
*C07F 7/00* (2006.01)

(52) U.S. Cl. .............. 526/172; 526/161; 526/160; 526/170; 526/943; 556/51; 556/52

(58) Field of Classification Search .............. 556/52, 556/51; 526/161, 126, 170, 943, 172, 162
See application file for complete search history.

(56) References Cited

U.S. PATENT DOCUMENTS

| | | | | |
|---|---|---|---|---|
| 5,055,438 A | | 10/1991 | Canich | |
| 5,451,649 A | * | 9/1995 | Zenk et al. | 526/160 |
| 5,670,680 A | * | 9/1997 | Newman et al. | 556/53 |
| 6,448,349 B1 | | 9/2002 | Razavi | |
| 6,469,188 B1 | * | 10/2002 | Miller et al. | 556/12 |
| 6,613,921 B2 | * | 9/2003 | Campbell et al. | 556/7 |
| 6,693,153 B2 | * | 2/2004 | Miller et al. | 526/127 |
| 6,939,928 B1 | * | 9/2005 | Kawai et al. | 526/160 |
| 7,081,493 B2 | * | 7/2006 | Kawai et al. | 524/505 |
| 2005/0131171 A1 | * | 6/2005 | Tohi et al. | 526/127 |
| 2006/0161013 A1 | * | 7/2006 | Tohi et al. | 556/11 |

FOREIGN PATENT DOCUMENTS

EP 416815 A2 3/1991

OTHER PUBLICATIONS

Miller et al. Organometallics, 2004, 23, 1777-1789.*
Razavi, et al., "Syndiotactic Specific Structures, Symmetry Considerations, Mechanistic Aspects", Organometallic Catalysts and Olefin Polymerization, Berlin (2001), pp. 267-279.

(Continued)

*Primary Examiner*—Ling-Sui Choi
*Assistant Examiner*—Rip A. Lee
(74) *Attorney, Agent, or Firm*—Robert C. Shaddox; Winstead Sechrest & Minick P.C.

(57) ABSTRACT

The present invention is directed to a novel composition, and to a method of making the composition, the composition being useful in catalyst systems for the homopolymerization and/or copolymerization of olefins, wherein such catalyst systems display a higher level of activity and stereoselectivity than previously reported. The present invention is also directed to novel polymeric compositions made with such catalyst systems, such as a novel syndiotactic polypropylene that melts at temperatures higher than previously reported.

32 Claims, 7 Drawing Sheets

OTHER PUBLICATIONS

Alt, et al., "Synthese, Charakterisierung und Polymerisationseigenschaften verbückter Haldbsandwichkomplexe des Titans, Zirconiums und Hafniums; Die Molekülstruktur von [C13H8-SiMe2-NtBu]ZrCl2", Journal of Organometallic Chemistry (1999), pp. 21-30, 572.

Andell, et al., "n3-Allyl Complexes of Molybdenum-IV. Preparation and Crystal Structures of Some Substituted-Cyclopentadienyl Molybdenum Allyl Derivatives", Polyhedron (1989) pp. 203-209, vol. 8 No. 2.

Biagioni, et al., "Reaction of (n5-C13H9)Mn(CO)3 with Alkylphosphines: Formation and Isolation of n1-Fluorenyl Complexes", Organometallics, (1990), pp. 547-551, 9.

Bochmann, et al., "Synthesis and Structure of [Me2C(C5H4)Flu)Zr(u-H)Cl]2, an n3:n5-Bonded ansa-Metallocene", Organometallics, (1993) pp. 4718-4720, 12.

Boussie, et al., A Fully Integrated High-Throughput Screening Methodology for the Discovery of New Polyolefin Catalysts: Discovery of a New Class of High Temperature Single-Site Group (IV) Copolymerization Catalysts, J. Am. Chem. Soc., (2003) pp. 4306-4317, 125.

Busico, et al., "Syndiotactic Poly(propylene) from [Me2Si(3,6-di-tert-butyl-9-fluorenyl)(N-tert-butyl)]TiCl2-Based Catalysts: Chain-End or Enantiotopic-Sites Stereocontrol?", Macromoletular Chemistry and Physics, (2003) pp. 1269-1274, 204.

Calderon, et al., "Stereochemically Nonrigid Organometallic Molecules. XXI. The Crystal and Molecular Structures of Tris(cyclopentadienyl)nitrosylmolybdenum", Journal of the American Chemical Society, (May 7, 1969) pp. 2528-2535, 91:10.

Calhorda, et al., "Exocyclic Coordination of the n3-Fluorenyl Anion: Experimental and Theoretical Study", Organometallics (1999) pp. 3956-3958, 18.

Calhorda, et al., "Exocyclic coordination of the n3-fluorenyl, n3-cyclopenta[def]-phenathrenyl and n3-8,9-dihydrocyclopenta[def]phenathrenyl anions: X-ray crystal structures, NMR fluxionality and theoretical studies", New J. Chem., (2002) pp. 1552-1558, 26.

Chien, et al., "Ethylene-Hexene Copolymerization by Heterogeneous and Homogeneous Ziegler-Natta Catalysts and the 'Commoner' Effect", Journal of Polymer Science: Part A: Polymer Chemistry, (1993) pp. 227-237, vol. 31.

Paul James Chirik, Ancillary Ligand Effects on Fundamental Transformations in Metallocene Catalyzed Olefin Polymerization, (2000) pp. 1-231.

Dang, et al., "Simple Route to Bis(3-indenyl)methanes and the Synthesis, Characterization, and Polymerizaiton Performance of Selected racemic-Dichloro[methylenebis(Rn-1-indenyl)]-zirconium Complexes", Organometallics, (1999) pp. 3781-3791, 18.

Rosa, et al., "Chain Conformation and Unit Cell in the Crystalline Phase of Syndiotactic Poly(4-methyl-1-pentene)", Macromolecules, (1992) pp. 6938-6942, 25.

Rosa, et al., "Equilibrium Melting Temperature of Syndiotactic Polypropylene", Macromolecules, (1998) pp. 6206-6210, 31.

Dias, et al., "Preparation of Group 4 metal complexes of a bulky amido-fluorenyl ligand", Journal of Organometallic Chemistry, (1996) pp. 91-99, 508.

Ewen, et al., "Syndiospecific Propylene Polymerizations with Group 4 Metallocenes", J. Am. Chem. Soc., (1988) pp. 6255-6256, 110.

Ewen, et al., "Chiral Ansa Metallocenes with Cp Ring-Fused to Thiophenes and Pyrroles: Syntheses, Crystal Structures and Iostactic Polypropylene Catalysts", J. Am. Chem. Soc., (2001) pp. 4763-4773, 123.

Fierro, et al., "Syndioselective Propylene Polymerization Catalyzed by rac-2,2-Dimethylpropylidene(1-n5-cyclopentadienyl) (1-n5-fluorenyl) dichlorozirconium", Journal of Polymer Science: Part A: Polymer Chemistry, (1994) pp. 661-673, vol. 32.

Gerkin, et al., "Structure of Fluorene, C13H10, at 159 K", Acta Cryst., (1984) pp. 1892-1894, C40.

Grisi, et al., "Group 4 Cs Symmetric catalysts and 1-olefin polymerization", Journal of Molecular Catalysis A: Chemical 140, (1999) pp. 225-233.

Hakansson, et al., "A Crystallographic and Computational Study of a Diethyl Ether Complex of Fluorenyllithium", Organometallics, (1998) pp. 1208-1214, 17.

Irwin, et al., "A Sterically Expanded 'Constrained Geometry Catalyst' for Highly Active Olefin Polymerization and Copolymerization: An Unyielding Comonomer Effect", J. Am. Chem. Soc., (2004) pp. 16716-16717, 126.

Irwin, et al., "Synthesis and characterization of sterically expanded ansa-n1-fluorenyl-amido complexes", Polyhedron, (2005) pp. 1314-1324, 24.

Ji, et al., "Kinetics and Mechanism of Substitution Reactions of Mn(n5-C9H7)(CO)3 and Mn(n5-C13H9)(CO)3", Organometallics, (1984) pp. 740-745, 3.

Kirillov, et al., "[(Cp-CMe2-Flu)2Ln]-[Li(ether)n]+ (Ln = Y, La): Complexes with Unusual Coordination Modes of the Fluorenyl Ligand and the First Examples of Bis-Ansa Lanthanidocenes", Organometallics, (2003) pp. 4038-4046, 22.

Kowala, et al., "The Crystal and Molecular Structure of (1-5-n-Fluorenyl)(1-3-n-Fluorenyl) dichlorozirconium(IV)", J.C.S. Chem. Comm., (1974) pp. 993-994.

Lanza, et al., "Energetic, Structural, and Dynamic Aspects of Ethylene Polymerization Mediated by Homogeneous Single-Site 'Constrained Geometry Catalysts' in the Presence of Cocatalyst and Solvation: An Investigation at the ab Initio Quantum Chemical Level", Organometallics, (2002) pp. 5594-5612, 21.

McKnight, et al., "Group 4 ansa-Cyclopentadienyl-Amido Catalysts for Olefin Polymerization", Chem. Rev., (1998) pp. 2587-2598, 98.

Mejdrich, et al., "Structures of (n1-Fluorenyl)RE(CO)5 and (n5-Fluorenyl)RE(CO)3 and Their Thermal Interconversion in Solid Matrices", Synthesis and Reactivity in Inorganic and Metal-Organic Chemistry, (1998) pp. 953-973, 28:6.

Miller, et al., "Highly Stereoregular Syndiotactic Polypropylene Formation with Metallocene Catalysts via Influence of Distal Ligand Substituents", Organometallics, (2004) pp. 1777-1789, 23.

Mitani, et al., "Fluorine- and Trimethylsilyl-Containing Phenoxy-Imine Ti Complex for Highly Syndiotactic Living Polyproplyenes with Extremely High Melting Temperatures", J. Am. Chem. Soc., (2002) pp. 7888-7889, 124.

O'Connor, et al., "Ring-Slippage Chemistry of Transition-Metal Cyclopentadienyl and Idenyl Complexes", Chem. Rev., (1987) pp. 307-318, 87.

Okuda, et al., "Synthesis and Characterization of Zirconium Complexes Containing a Linked Amido-Fluorenyl Ligand", Organometallics, (1995) pp. 789-795, 14.

Razavi, et al., "Preparation and crystal structures of the complexes (n5-C5H3TMS-CMe2-n5-C13H8)MCl2 and [3,6-ditButC13H6-SiMe2-NtBu]MCl2 (M = Hf, Zr or Ti): mechanistic aspects of the catalytic formation of a isotactic-syndiotactic stereoblock-type polypropylene", Journal of Organometallic Chemistry, (2001) pp. 267-276, 621.

Razavi, et al., "Fluorenyl Based Syndiotactic Specific Metallocene Catalysts Structural Features, Origin of Syndiospecificity", Macromol. Symp., (2004) pp. 157-171, 213.

Resconi, et al., "High-Molecular-Weight Atactic Polypropylene from Metallocene Catalysts. 1. Me2Si(9-Flu)2ZrX2 (X = Cl, Me)", Organometallics, (1996) pp. 998-1005, 15.

Resconi, et al., "Selectivity in Propene Polymerization with Metallocene Catalysts", Chem. Rev., (2000) pp. 1253-1345, 100.

Schmid, et al., "Sterisch überiadene Zirconocenkomplexe—erstes Beispiel für einen o-gebundenen Fluorenylliganden", Journal of Organometallic Chemistry, (1997) pp. 3-7, 541.

Shapiro, et al., "[{(n5-C5Me4)Me2Si(n1-NCMe3)}(PMe3)ScH]2: A Unique Example of a Single-Component a-Olefin Polymerization Catalyst", Organometallics, (1990) pp. 867-869, 9.

Shapiro, et al., "Model Ziegler-Natta a-Olefin Polymerization Catalysts Derived from [{(n5-C5Me4)SiMe2(n1-NCMe3)}(PMe3)Sc(u2-H)]2 and [{(n5-C5Me4)SiMe2(n1-NCMe3)}Sc(u2-CH2CH2CH3)]2. Synthesis, Structures, and Kinetic and Equilibrium Investigations of the Catalytically Active Species in Solution", J. Am. Chem. Soc., (1994) pp. 4623-4640, 116.

Sui-Seng, et al., "New Routes to n1- and (n3<—>n5)-Indenylpalladium Complexes: Syntheses, Characterization, and Reactivities", Organometallics, (2004) pp. 1236-1246, 23.

Veghini, et al., "Mechanisms of Stereocontrol for Doubly Silylene-Bridged Cs- and C1-Symmetric Zirconocene Catalysts for Propylene Polymerization. Synthesis and Molecular Structure of Li2[(1,2-Me2Si)2(C5H2-4-{1R,2S,5R-menthyl})(C5H-3,5-((CHMe2)2))] 3THF and [(1,2-M32Si)2{n5-C5H2-4-(1R,2S,5R-menthyl}{n5-C5H-3,5-(CHMe2)2}]ZrCl2", J. Am. Chem. Soc., (1999) pp. 564-573, 121.

Xu, et al., "Ethylene Copolymerization with 1-Octene Using a 2-Methylbenz[e]indenyl-Based ansa-Monocyclopentadienylamido Complex and Methyaluminoxanes Catalyst", Macromolecules, (1998) pp. 4724-4729, 31.

Guangxue Xu, "Copolymerization of Ethylene with Styrene Catalyzed by the [n1:n5-tert-Butyl(dimenthylfluorenylsily)amido]methyltitanium 'Cation'", Macromolecules, (Apr. 21, 1998) pp. 2395-2402, 31:8.

Xu, et al., "Homo- and Copolymerization of 4-Methyl-1-pentene and Ethylene with Group 4 ansa-Cyclopentadienylamido Complexes", Macromolecules, (2001) pp. 2040-2047, 34.

Yamada, et al., "Equilibrium Melting Temperature of Isotactic Polypropylene with High Tacticity: 1. Determination by Differential Scanning Calorimetry", Macromolecules, (2003) pp. 4790-4801, 36.

Young, et al., "Comparison of the Thermal and Photochemical Reactions of (n1-Cyclopentadienyl)Re (CO)5 and (n1-9-Fluorenyl)Re(CO)5: Nonthermal Chemical Reactions from the Lowest Excited State", J. Am. Chem. Soc., (1990) pp. 1529-1537, 112.

Zemánek, et al., "Synthesis and Crystal Structures of Dimethylsilylene-Bridged (Amidocyclopentadienyl) Dichlorotitanium(IV) Complexes with Various Substituents on the Cyclopentadienyl Ligand", Collect. Czech. Chem. Commun., (2001) pp. 605-620, 66.

\* cited by examiner

Scheme 1

Scheme 2

3-Zr
 3-Hf
 5-Zr
 6-Zr
 6-Hf
 7-Zr

CATALYST SYSTEM FOR HIGH ACTIVITY AND STEREOSELECTIVITY IN THE HOMOPOLYMERIZATION AND COPOLYMERIZATION OF OLEFINS

This Application for patent claims priority to U.S. Provisional Patent Application Ser. No. 60/586,570, filed Jul. 9, 2004.

This invention was made with support from the Robert A. Welch Foundation, Grant No. A-1537; and the Texas Higher Education Coordinating Board, Advanced Technology Program, Grant No. 010366-0196-2003.

TECHNICAL FIELD

The present invention relates generally to catalyst materials, and more specifically to catalyst materials for polymerizing olefins.

BACKGROUND INFORMATION

Constrained geometry catalysts (CGCs) have received considerable attention because of their ability to copolymerize ethylene with α-olefins, forming linear low density polyethylene (LLDPE) on the commercial scale of several billion pounds per year (see Stevens et al., Eur. Patent Appl. EP 416815-A2, 1991 (Dow Chem. Co); Canich, Eur. Patent Appl. EP 420436-A1, 1991 (Exxon Chem. Co.); Shapiro et al., Organometallics, vol. 9, pp. 867–869, 1990; Shapiro et al., J. Am. Chem. Soc., vol. 116, pp. 4623–4640, 1994; McKnight et al., Chem. Rev., vol. 98, pp. 2587–2598, 1998; McKnight et al., Organometallics, vol. 16, pp. 2879–2885, 1997; Lanza et al., Organometallics, vol. 21, pp. 5594–5612, 2002; and Xu et al., Macromolecules, vol. 34, pp. 2040–2047, 2001). Reportedly, α-olefin incorporation exceeds that with other organometallic catalyst systems because of the steric accessibility afforded by the linked cyclopentadienyl-amido ancillary ligand. Although the precatalyst $Me_2Si(\eta^5-C_5Me_4)(\eta^1-N-^tBu)TiMe_2$ is considered to be the commercial standard for ethylene/1-octene copolymerizations (Boussie et al., J. Am. Chem. Soc., vol. 125, pp. 4306–4317, 2003), it has been shown that indenyl-amido CGC systems such as $Me_2Si(\eta^5$- 2-Me-benz[e]Ind)$(\eta^1$-N-$^tBu)TiCl_2$/MAO (MAO=methylaluminoxane) can provide high activity and moderate α-olefin incorporation in ethylene/1-octene copolymerizations (see Xu et al., Macromolecules, vol. 31, pp. 4724–4729, 1998). In contrast, existing fluorenyl-amido polymerization systems such as $Me_2Si(\eta^5$-$C_{13}H_8)(\eta^1$-N-$^tBu)TiCl_2$/MAO are typically inferior with respect to activity, comonomer incorporation, molecular weight, thermal sensitivity, and catalytic lifetime. See Xu et al., Macromolecules, vol. 34, pp. 2040–2047, 2001; Okuda et al., Organometallics, vol. 14, pp. 789–795, 1995; Dias et al., J. Organomet. Chem., vol. 508, pp. 91–99, 1996; Xu et al., Macromolecules, vol. 31, pp. 2395–2402, 1998; Alt et al., J. Organomet. Chem., vol. 572, pp. 21–30, 1999; and Razavi et al, J. Organomet. Chem., vol. 621, pp. 267–276, 2001.

In 1988, Ewen, Razavi, et al. first reported the use of a single-site catalyst for the preparation of syndiotactic polypropylene (s-PP), a high-melting, crystalline thermoplastic. The ansa-zirconocene $Me_2C(\eta^5-C_5H_4)(\eta^5-C_{13}H_8)ZrCl_2$, upon activation with methylaluminoxane (MAO), produced stereoregular s-PP with a $T_m$ (melting temperature) of 138° C. and a stereochemical [rrrr] pentad fraction of 86% (Ewen et al., J. Am. Chem. Soc., vol. 110, pp. 6255–6256; For a general review of propylene polymerization via metallocene catalysts see: Resconi et al., Chem. Rev., vol. 100, pp. 1253–1345, 2000). Since this report, commercial interest in s-PP has increased; global production is anticipated to grow to $4 \times 10^8$ kg of s-PP per year by 2010, approaching 1% of worldwide polypropylene capacity (Shamshoum, E.; Schardl, J. in Metallocene-Catalyzed Polymers—Materials, Properties, Processing and Markets; Benedikt, G. M., Goodall, B. L., Eds.; Plastics Design Library: Norwich, N.Y., 1998, pp. 359–368.). Despite a number of superior physical properties—such as greater optical clarity, tear resistance, and impact strength—the development of s-PP has lagged behind that of isotactic polypropylene (i-PP), which can be made with [mmmm]>99% and a $T_m$ as high as 166° C. (Ewen et al., J. Am. Chem. Soc., vol. 123, pp. 4763–4773, 2001).

Attempts to improve catalyst activity and syndioselectivity have resulted in several second generation single-site catalysts, including doubly-bridged metallocenes (e.g., [(1,2-$Me_2Si)_2$ $\{\eta^5-C_5H_3\}$ $\{\eta^5-C_5H-3,5-(CHMe_2)_2\}]ZrCl_2$, Veghini et al., J. Am. Chem. Soc., vol. 121, pp. 564–573, 1999), fluorenyl-amido constrained geometry catalysts (CGCs) (e.g., $Me_2Si(\eta^1$-N-$^tBu)(\eta^5$-3,6-$^tBu_2C_{13}H_6)ZrCl_2$, Razavi et al., J. Organomet. Chem., vol. 621, pp. 267–276, 2001; Busico et al., Macromol. Chem. Phys., vol. 204, pp. 1269–1274), coordination compounds (e.g., bis[N-(3-(SiMe$_3$)salicylidene)-2,3,4,5,6-pentafluoroanilinato]-TiCl$_2$, Mitani et al., J. Am. Chem. Soc., vol. 124, pp. 7888–7889, 2002), and sterically expanded versions of the parent Ewen-type catalyst such as $Me_2C(\eta^5-C_5H_4)(\eta^5-C_{29}H_{36})ZrCl_2$, which provided markedly improved s-PP with [rrrr]=92% and an unannealed $T_m$ of 154° C. (Miller et al., Organometallics, vol. 23, pp. 1777–1789, 2004). These efforts, however, have generally suffered from arduous catalyst syntheses (e.g., [(1,2-$Me_2Si)_2\{\eta^5-C_5H_3\}$ $\{\eta^5-C_5H-3,5-(CHMe_2)_2\}]ZrCl_2$, Veghini et al., J. Am. Chem. Soc. 1999, 121, 564–573), low catalytic activity (e.g., bis[N-(3-(SiMe$_3$)salicylidene)-2,3,4,5,6-pentafluoroanilinato]-TiCl$_2$, Mitani et al., J. Am. Chem. Soc., vol. 124, pp. 7888–7889), thermal instability, and poor syndioselectivity (e.g., $Me_2Si(\eta^1$-N-$^tBu)$ $(\eta^5$-3,6-$^tBu_2C_{13}H_6)ZrCl_2$), Razavi et al., J. Organomet. Chem., vol. 621, pp. 267–276, 2001; Busico et al., Macromol. Chem. Phys., vol. 204, pp. 1269–1274, 2003). Accordingly, a catalyst or catalyst system capable of overcoming one or more of these limitations would be exceedingly beneficial.

SUMMARY OF THE INVENTION

In general terms, the present invention is directed to novel compositions, and to methods of making such compositions, the compositions being useful in catalyst systems for the homopolymerization and/or copolymerization of olefins, wherein such catalyst systems display a higher level of activity and/or stereoselectivity than previously reported. The present invention is also directed to novel polymeric compositions made with such catalyst systems, such as a novel syndiotactic polypropylene that melts at temperatures higher than previously reported.

In some embodiments, the present invention is directed to an organometallic complex having the formula: $R_2Si(\eta^n$-$C_{29}H_{36})(\eta^1$-N—R')M'X$_2$.L, where (a) R is selected from the group consisting of alkyl groups, aryl groups, and combinations thereof; (b) n is selected from the group consisting of 1 and 5; (c) R' is selected from the group consisting of alkyl groups and aryl groups; (d) M' is a transition metal; (e) X is selected from the group consisting of halides, alkyl groups, aryl groups, and combinations thereof; and (f) L is an optional adduct, typically being an ether. In some embodiments, this organometallic complex is operable for use as a catalyst or precatalyst for olefin polymerization.

In some embodiments, the present invention is directed to a method for making the above-mentioned organometallic complex (R$_2$Si($\eta^n$-C$_{29}$H$_{36}$) ($\eta^1$-N—R')M'X$_2$.L), the method comprising the steps of: (a) forming an OctM (C$_{29}$H$_{37}$M) species generated from C$_{29}$H$_{38}$ (octamethyloctahydrodibenzofluorene) and an alkali alkyl species, where M is an alkali metal; (b) combining a hydrocarbon-based slurry of OctM with an excess of an Cl$_2$Si(R)$_2$ species to form a first reaction product, wherein R is selected from the group consisting of alkyl groups, aryl groups, and combinations thereof; (c) adding an metal alkyl amide species M"NHR' species to the first reaction product to form a second reaction product, wherein M" is a metal and R' is selected from the group consisting of alkyl groups, aryl groups, and combinations thereof; (d) adding an alkali alkyl species to the second reaction product to doubly deprotonate the second reaction product and form a third reaction product, a dialkali salt; and (e) combining the dialkali salt with a M'X$_4$ species in the presence of a species L to form a product R$_2$Si ($\eta^n$-C$_{29}$H$_{36}$)($\eta^1$-N—R')M'X$_2$.L; wherein M' is a transition metal; X is selected from the group consisting of halides, alkyl groups, aryl groups, and combinations thereof; and L is an optional adduct in the product. In some embodiments, the product R$_2$Si($\eta^n$-C$_{29}$H$_{36}$)($\eta^1$-N—R')M'X$_2$.L is further reacted with an alkali alkyl species MR" to form a variant product R$_2$Si($\eta^n$-C$_{29}$H$_{36}$)($\eta^1$-N—R')M'R"$_2$.L, where M is an alkali metal, R" is an alkyl group differing from X, and L is an optional adduct in the product.

In some embodiments, the present invention is directed to a catalyst system comprising: (a) a quantity of the above-described organometallic complex (R$_2$Si($\eta^n$-C$_{29}$H$_{36}$)($\eta^1$-N—R')M'X$_2$.L); and (b) a co-catalyst. In some such embodiments, the co-catalyst is selected from the group consisting of alkylaluminoxanes, boron-based Lewis acids, borate-based salts, amine salts, and the like. In some such embodiments, such a catalyst system is operable for making homopolymers, copolymers, terpolymers, and the like, wherein all such polymers may comprise long-chain and/or short-chain branches. In some particular embodiments, such catalyst systems are operable for making syndiotactic polypropylene, wherein such syndiotactic polypropylene can have an un-annealed melting temperature $T_m$ near or above 157° C. Syndiotactic polypropylene produced with such catalyst systems are novel compositions of matter, as illustrated by its high $T_m$ and high stereochemical pentad fraction—in some cases being greater than 99%.

The foregoing has outlined rather broadly the features of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
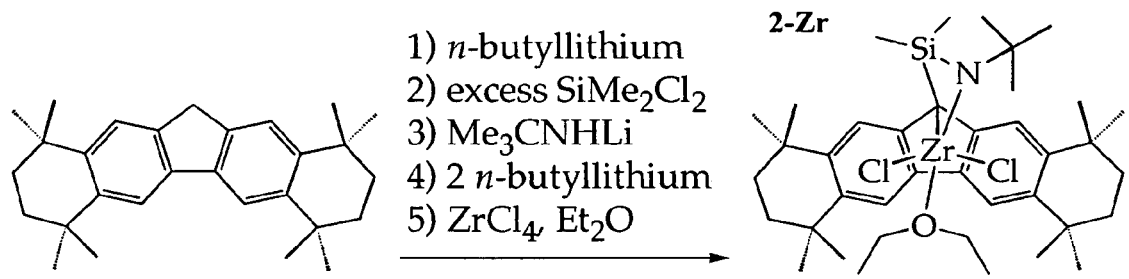
FIG. 1 (Scheme 1) depicts the synthesis of Me$_2$Si($\eta^1$-C$_{29}$H$_{36}$)($\eta^1$-N-$^t$Bu)ZrCl$_2$.OEt$_2$ (2-Zr), in accordance with some embodiments of the present invention.

The present invention is directed to a novel composition, and to a method of making the composition, the composition being useful in catalyst systems for the homopolymerization and/or copolymerization of olefins, wherein such catalyst systems display a higher level of activity and/or stereoselectivity than previously reported. The present invention is also directed to novel polymeric compositions made with such catalyst systems, such as a novel syndiotactic polypropylene that melts at temperatures higher than previously reported.

In some embodiments, the present invention is directed to an organometallic complex having the formula: R$_2$Si($\eta^n$-C$_{29}$H$_{36}$)($\eta^1$-N—R')M'X$_2$.L, where (a) R is selected from the group consisting of alkyl groups, aryl groups, and combinations thereof; (b) n, reflecting the degree of hapticity, is selected from the group consisting of 1 and 5; (c) R' is selected from the group consisting of alkyl groups and aryl groups; (d) M' is a transition metal; (e) X is selected from the group consisting of halides, alkyl groups, aryl groups, and combinations thereof; and (f) L is an optional adduct, typically being an ether. In some embodiments, this organometallic complex is operable for use as a catalyst or precatalyst for olefin polymerization. Note that the terms "alkyl group" and "aryl group," as used herein, should be subject to broad interpretation, including, but not limited to, substituted varieties thereof.

In some such above-described embodiments, M' is Group IV transition metal such as, but not limited to, Hf, Zr, Ti, and the like. In some such embodiments, X is selected from the group consisting of F, Cl, Br, I, and combinations thereof. In some such embodiments, R is a methyl (Me) group. In some such embodiments, R' is a tert-butyl ($^t$Bu) group. In some such embodiments, L is an ether. Suitable L adducts include, but are not limited to OEt$_2$, THF, CH$_3$CN, and the like. In some embodiments, the above-described organometallic complex is a trigonal bipyramidal species having a formula selected from the group consisting of Me$_2$Si($\eta^1$-C$_{29}$H$_{36}$)($\eta^1$-N-$^t$Bu)ZrBr$_2$.OEt$_2$, Me$_2$Si($\eta^1$-C$_{29}$H$_{36}$)($\eta^1$-N-$^t$Bu)ZrCl$_2$.OEt$_2$, Me$_2$Si($\eta^1$-C$_{29}$H$_{36}$)($\eta^1$-N-$^t$Bu)HfBr$_2$.OEt$_2$, and Me$_2$Si($\eta^1$-C$_{29}$H$_{36}$)($\eta^1$-N-$^t$Bu)ZrMe$_2$THF.

In some embodiments, the present invention is directed to a method for making the above-mentioned organometallic complex (R$_2$Si($\eta''$-C$_{29}$H$_{36}$)($\eta^1$-N—R')M'X$_2$.L), the method comprising the steps of: (a) forming an OctM (C$_{29}$H$_{37}$M) species generated from C$_{29}$H$_{38}$ (octamethyloctahydrodibenzofluorene) and an alkali alkyl species, where M is an alkali metal; (b) combining a hydrocarbon-based slurry of OctM with an excess of an Cl$_2$Si(R)$_2$ species to form a first reaction product, wherein R is selected from the group consisting of alkyl groups, aryl groups, and combinations thereof; (c) adding an metal alkyl amide species M"NHR' species to the first reaction product to form a second reaction product, wherein M" is a metal and R' is selected from the group consisting of alkyl groups, aryl groups, and combinations thereof; (d) adding an alkali alkyl species to the second reaction product to doubly deprotonate the second reaction product and form a third reaction product, a dialkali salt; and (e) combining the dialkali salt with a M'X$_4$ species in the presence of a species L to form a product R$_2$Si($\eta_n$-C$_{29}$H$_{36}$)($\eta^1$-N—R')M'X$_2$.L; wherein M' is a transition metal; X is selected from the group consisting of halides, alkyl groups, aryl groups, and combinations thereof; and L is an optional adduct in the product. In some embodiments, the product R$_2$Si($\eta''$-C$_{29}$H$_{36}$)($\eta^1$-N—R')M'X$_2$.L is further reacted with a a second alkali alkyl species MR" to form a variant product R$_2$Si($\eta''$-C$_{29}$H$_{36}$)($\eta^1$-N—R')M'R"$_2$.L, where M is an alkali metal and R" is an alkyl group differing from X.

In some above-described method embodiments, the alkali alkyl species is selected from the group consisting of alkyllithium species, alkylsodium species, alkylpotassium species, and combinations thereof. In some such embodiments, the alkali alkyl species is n-butyllithium. In some embodiments, the hydrocarbon-based slurry comprises a hydrocarbon-based solvent selected from the group consisting of alkanes, ethereal solvents, and combinations thereof. In some embodiments, OctM is OctLi. In some embodiments, the Cl$_2$Si(R)$_2$ species is dichlorodimethylsilane (Cl$_2$Si(CH$_3$)$_2$). In some embodiments, the metal alkyl amide species M"NHR' species is lithium tert-butyl amide (LiNHC(CH$_3$)$_3$). In some embodiments, the dialkali salt is LiNC(CH$_3$)$_3$Si(CH$_3$)$_2$(C$_{29}$H$_{36}$Li). In some embodiments, adduct L is OEt$_2$. In some embodiments, adduct L is labile.

In some embodiments, the present invention is directed to a catalyst system comprising: (a) a quantity of the above-described organometallic complex (R$_2$Si($\eta''$-C$_{29}$H$_{36}$)($\eta^1$-N—R')M'X$_2$.L); and (b) a co-catalyst. Note that in some embodiments, the organometallic complex may change form upon being combined with the co-catalyst, i.e., it is a pre-catalyst. In some embodiments, the co-catalyst is selected from the group consisting of alkylaluminoxanes, boron-based Lewis acids, borate-based salts, amine salts, and the like. Exemplary such co-catalysts include, but are not limited to MAO (methylaluminoxane), B(C$_6$F$_5$)$_3$, (C$_6$H$_5$)$_3$C$^+$B(C$_6$F$_5$)$_4^-$, HMe$_2$N(C$_6$H$_5$)$^+$B(C$_6$F$_5$)$_4^-$, and combinations thereof.

In some embodiments, the above-described catalyst system is used to make homopolymers, wherein such homopolymers are made from olefins, and wherein such olefins are selected from the group consisting of ethylene, propylene, 1-butene, 4-methyl-1-pentene, 1-hexene, and 1-octene. In some embodiments, such olefins are α-olefins. In some embodiments, the above-described catalyst system is used to make copolymers, wherein such copolymers are made from any combination of olefins, wherein such olefins are selected from the group consisting of ethylene, propylene, 1-butene, 4-methyl-1-pentene, 1-hexene, and 1-octene, and wherein some such copolymers comprise branches selected from the group consisting of long-chain branches, short-chain branches, and combinations thereof. In some embodiments, the above-described catalyst system is used to make terpolymers, wherein such terpolymers are made from any combination of olefins, wherein such olefins are selected from the group consisting of ethylene, propylene, 1-butene, 4-methyl-1-pentene, 1-hexene, and 1-octene, and wherein some such terpolymers comprise branches selected from the group consisting of long-chain branches, short-chain branches, and combinations thereof. In some embodiments, the above-described catalyst system is used to make polymers, wherein such polymers are made from ethylene and comprise branches selected from the group consisting of long-chain branches, short-chain branches, and combinations thereof. Where these polymers comprise novel properties such that they are novel compositions, these novel compositions are deemed to fall within the scope of the present invention.

In some embodiments, the above-described catalyst system is used to make syndiotactic polypropylene (s-PP). The syndiotactic polypropylene made using the above-described catalyst system is novel in that it can have an un-annealed melting temperature ($T_m$) near or above 157° C. While not intending to be bound by theory, this is believed to be due to a much smaller number of stereochemical errors or "mistakes" which are introduced into the polymer chain. Such mistakes, as defined herein, refer to stereochemical disruptions or errors contained within the polymer chain. Fewer such mistakes result in a higher stereochemical pentad fraction [rrrr]. In some embodiments, s-PP made by such catalyst systems have pentad fractions generally greater than 90%, typically greater than 95%, and potentially greater than 99%.

The following examples are included to demonstrate particular embodiments of the present invention. It should be appreciated by those of skill in the art that the methods disclosed in the examples that follow merely represent exemplary embodiments of the present invention. However, those of skill in the art should, in light of the present disclosure, appreciate that many changes can be made in the specific embodiments described and still obtain a like or similar result without departing from the spirit and scope of the present invention.

EXAMPLE 1

This Example serves to described the general synthesis of Me$_2$Si($\eta^1$-C$_{29}$H$_{36}$)($\eta^1$-N-$^t$Bu)ZrCl$_2$.OEt$_2$ (2-Zr), a sterically expanded zirconium fluorenyl-amido complex with an activity and α-olefin incorporation ability far exceeding those of even most titanium systems.

Figure 2:
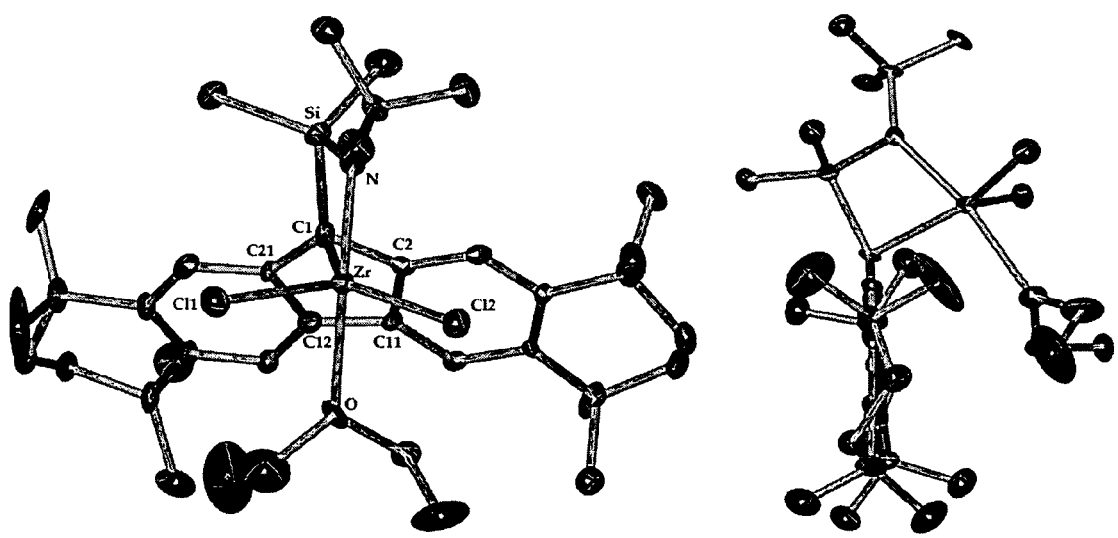
FIG. 2 depicts the structure of Me$_2$Si($\eta^1$-C$_{29}$H$_{36}$)($\eta^1$-N-$^t$Bu)ZrCl$_2$.OEt$_2$ (2-Zr) with 50% probability ellipsoids (frontal and side views, hydrogens omitted), where selected bond lengths (Å) and angles (°) are as follows: Zr—Cl(1)= 2.3918(18); Zr—Cl(2)=2.4155(19); Zr—N=2.013(5); Zr—O=2.330(5); Cl—Zr—Cl=112.92(7); Cl(1)—Zr—C=110.87(18); Cl(2)—Zr—C=136.16(18); C—Zr—N=76.8 (2); C—Zr—O=93.40(18); and N—Si—C=95.3(3)

The above-mentioned synthesis is facile and scalable, while the starting materials are accessible and inexpensive—making 2-Zr an ideal candidate for commercial utilization. The synthesis of 2-Zr is outlined in FIG. 1 (Scheme 1) and begins with octamethyloctahydrodibenzofluorene (Miller et al., Organometallics, vol. 23, pp. 1777–1789, 2004), a sterically augmented version of fluorene (14 Å vs. 9 Å). The X-ray structure of 2-Zr is shown in FIG. 2 and represents the most sterically open constrained geometry catalyst (CGC) reported to date (note that yellow needle-like crystals of 2-Zr were grown by cooling a saturated ether solution to −35° C. Crystal data: monoclinic, $C_c$, a=24.079(6) Å, b=11.723(3) Å, c=14.917(3) Å, α=90°, β=109.199(5)°, γ=90°, V=3976.4 (16) Å$^3$, Z=4, T=110(2) K, $R_1$ (on $F_o$)=0.0618, $wR_2$ (on $F_o^2$)=0.0907, GOF=1.046 for 420 parameters and 6238 unique data). FIG. 2 depicts the structure of $Me_2Si(\eta^1\text{-}C_{29}H_{36})(\eta^1\text{-}N\text{-}^tBu)ZrCl_2 \cdot OEt_2$ (2-Zr) with 50% probability ellipsoids (frontal and side views, hydrogens omitted), with selected bond lengths (Å) and angles (°): Zr—Cl(1)=2.3918 (18); Zr—Cl(1)=2.3918(18); Zr—Cl(2)=2.4155(19); Zr—N=2.013(5); Zr—O=2.330(5); Cl—Zr—Cl=112.92(7); Cl(1)—Zr—C=110.87(18); Cl(2)—Zr—C=136.16(18); C—Zr—N=76.8(2); C—Zr—O=93.40(18); N—Si—C=95.3(3). Inspection of the interatomic distances between the Zr and the five-membered ring of the $C_{29}H_{36}$ fragment reveals that the Zr—C(1) bond (2.299(7) Å) is notably shorter than those in analogous systems, which range from 2.377(7) to 2.430(5) Å (Okuda et al., Organometallics, vol. 14, pp. 789–795, 1995; Dias et al., J. Organomet. Chem., vol. 508, pp. 91–99, 1996; Xu, G. Macromolecules, vol. 31, pp. 2395–2402, 1998; Alt et al., J. Organomet. Chem., vol. 572, pp. 21–30, 1999; and Razavi et al., J. Organomet. Chem., vol. 621, pp. 267–276, 2001). The next shortest Zr—C distance is 2.731(6) Å (Zr—C(2)), which is most accurately described as only a weak interaction (Kowala et al., Acta Crystallogr., vol. B32, pp. 820–823, 1976; Resconi et al., Organometallics, vol. 15, pp. 998–1005, 1996; and Miller et al., Organometallics, vol. 19, pp. 5608–5613, 2000). Thus, the $C_{29}H_{36}$ fragment is best categorized as a simple $\eta^1$ X-type ligand (note that an $\eta^1$-fluorenyl bound to tantalum (Ta) has been reported in $Me_2C(\eta^5\text{-}C_5H_4)(\eta^1\text{-}C_{13}H_8)TaMe_3$: Chirik, P. J. Ph.D. Thesis, California Institute of Technology, 2000) and 2-Zr is formally a 12 electron trigonal-bipyramidal organometallic complex having amido and ethereal ligands in the axial positions (N—Zr—O=169.9°). As a consolation to the electron deficient metal center, some stabilization is found in that the aromaticity of the aryl rings of the $C_{29}H_{36}$ moiety is not sacrificed—unlike the situation in all $\eta^5$-fluorenyl ligands.

Further details regarding the synthesis of 2-Zr can be found in Irwin et al., J. Am. Chem. Soc., vol. 126, 16716–16717, 2004 and corresponding supplementary information, incorporated by reference herein.

EXAMPLE 2

This Example serves to illustrate MAO-cocatalyzed polymerization and copolymerization results of $Me_2Si(\eta^1\text{-}C_{29}H_{36})(\eta^1\text{-}N\text{-}^tBu)ZrCl_2 \cdot OEt_2$ (2-Zr), a sterically expanded zirconium fluorenyl-amido complex with an activity and α-olefin incorporation ability far exceeding those of even most titanium systems. The unusual structure of this pre-catalyst is likely related to its high polymerization and copolymerization activity, thermal stability, propensity to incorporate bulky α-olefins at unprecedented levels, and ability to form generally inaccessible copolymers such as copoly(1-octene/4-methyl-1-pentene).

The data found in Table 1 indicates that 2-Zr/MAO is extremely effective in the homopolymerization of α-olefins. The activity in the homopolymerization of 4-methyl-1-pentene is about 10 times greater than that for $Me_2Si(\eta^5\text{-}C_5Me_4)(\eta^1\text{-}N\text{-}^tBu)TiCl_2$/MAO (I/MAO). Additionally, the homopolymerization of 1-octene with 2-Zr/MAO is strikingly efficient, converting 49% of the monomer to poly(1-octene) in one minute with an activity that is 85 times greater than that for (I/MAO).

TABLE 1

Polymerization and copolymerization activities with 2-Zr/MAO and I/MAO.[a]

| Monomer 1 | Conc. M | Monomer 2 | Conc. M | Activity[b] (2-Zr) | Activity[b] (I) |
|---|---|---|---|---|---|
| ethylene | 0.5 | — | — | 4,100[c] | 26,800[c,d] |
| 4-Me-P | 7.54 | — | — | 27,800 | 2,900 |
| 1-octene | 6.17 | — | — | 316,000 | 3,700 |
| 4-Me-P | 7.54 | ethylene | 0.5 | 209,000 | 184,000 |
| 1-octene | 6.17 | ethylene | 0.5 | 438,000 | 477,000[d] |
| 4-Me-P | 3.62 | 1-octene | 3.19 | 166,000 | 3,200 |

[a]1.66 μmol 2-Zr or I; 1000 equivalents MAO; $T_p$ = 75° C.; 1.0 minute; 26 mL total volume; solvent = toluene; 80 psi ethylene, where applicable; 4-Me-P = 4-methyl-1-pentene.
[b]kg polymer/(mol M · h).
[c]Average of three runs.
[d]0.5 minute runs.

An unexpected result for 2-Zr/MAO is that the observed activity for ethylene homopolymerization is the lowest. Correcting for monomer concentration, the first generation Ti-CGC I/MAO is 140 times more active for ethylene homopolymerization than for 4-methyl-1-pentene homopolymerization. Similarly, I/MAO is 90 times more active for ethylene homopolymerization than for 1-octene homopolymerization (Xu et al., Macromolecules, vol. 31, pp. 4724–4729, 1998). Adjusting the homopolymerization values in Table 1 for monomer concentration reveals that 2-Zr/MAO is merely 2 times more active with ethylene than with 4-methyl-1-pentene, despite the fact that the latter is a branched α-olefin. Astoundingly, the activity for ethylene homopolymerization is one sixth that of 1-octene homopolymerization. Indeed, 2-Zr/MAO can exhibit an inverted preference for α-olefin homopolymerization over ethylene homopolymerization. Such a tendency is without precedent.

Table 1 also highlights the copolymerization ability of 2-Zr/MAO. As long as ethylene is present, the copolymerization activity of I/MAO is comparable to that of 2-Zr/MAO. However, when 4-methyl-1-pentene and 1-octene are copolymerized by 2-Zr/MAO, the activity is less than when ethylene is present, but nonetheless is 52 times more active than with I/MAO and easily excels that of any known CGC for the copolymerization of two bulky α-olefins. These findings further emphasize the unusually high reactivity of 2-Zr/MAO towards α-olefins.

Figure 3:
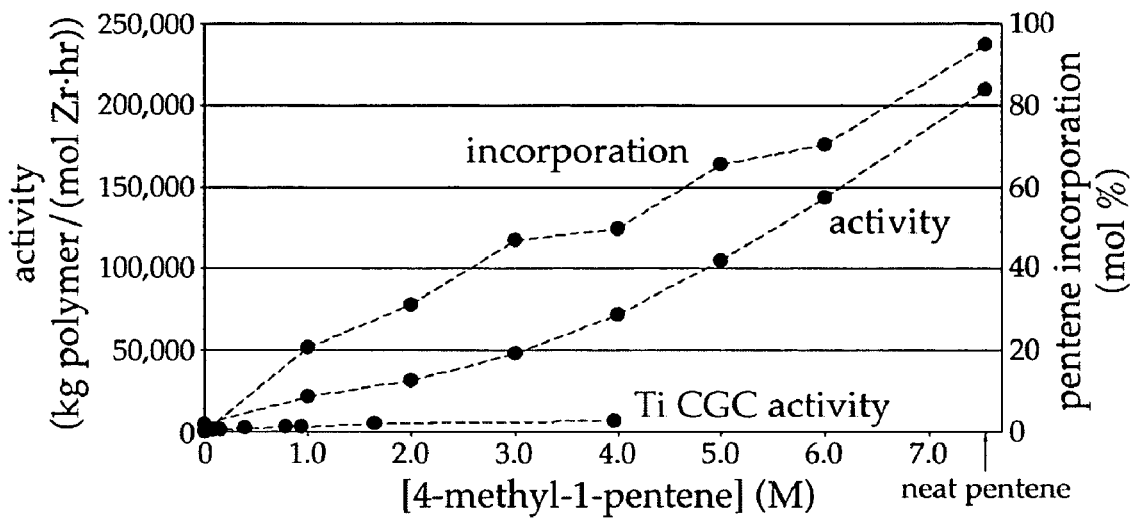
FIG. 3 illustrates that activity and 4-methyl-1-pentene incorporation with 2-Zr/MAO are proportional to comonomer concentration in ethylene/4-methyl-1-pentene copolymerizations ($T_p$=75° C.; 80 psi ethylene in toluene), where the activity response of Me$_2$Si($\eta^5$-2,3-Me$_2$-benz[e]Ind)($\eta^1$-N-$^t$Bu)TiCl$_2$/MAO is shown for comparison.
Figure 4:
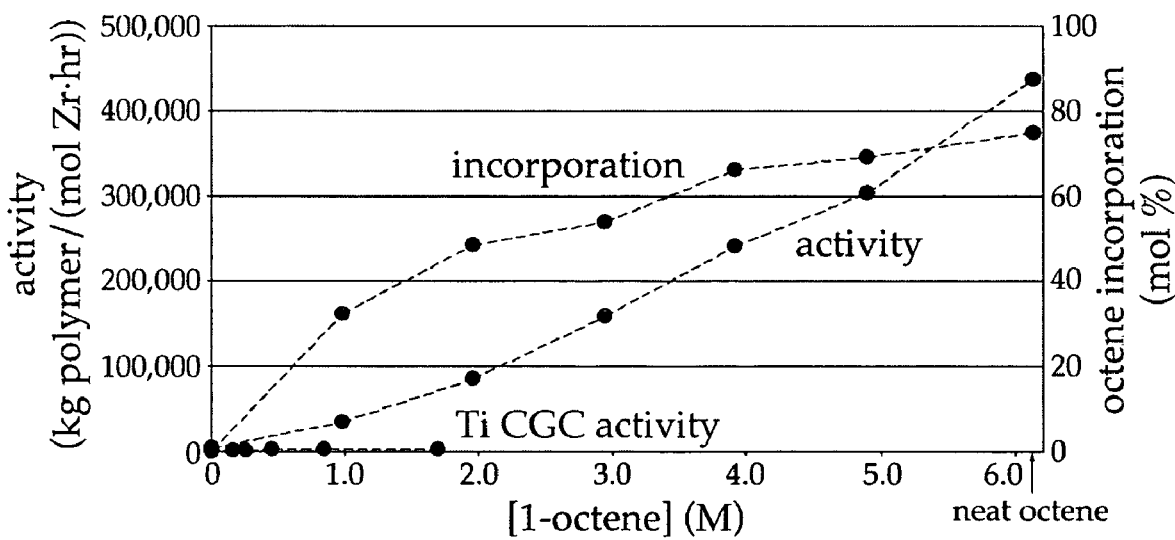
FIG. 4 illustrates that activity and 1-octene incorporation with 2-Zr/MAO are proportional to comonomer concentration in ethylene/1-octene copolymerizations ($T_p$=75° C.; 80 psi ethylene in toluene), where the activity response of Me$_2$Si($\eta^5$-2-Me-benz[e]Ind)($\eta^1$-N-$^t$Bu)TiCl$_2$/MAO is shown for comparison.

Although some ethylene polymerizations initially exhibit a measurable increase in activity upon introduction of an α-olefin (the comonomer effect) (Chien et al., J. Polym. Sci. Part A: Polym. Chem., vol. 31, pp. 227–237, 1993), the overall trend for homogeneous Ziegler-Natta olefin copolymerization systems invariably reveals a diminished activity as α-olefin concentration further increases. 2-Zr/MAO operates contrary to this trend. In ethylene/4-methyl-1-pentene copolymerizations with 2-Zr/MAO, the activity follows an approximate linear relationship with 4-methyl-1-pentene concentration at all concentrations, including neat comonomer. FIG. 3 illustrates this relationship and also indicates the mol % of 4-methyl-1-pentene incorporated into the polymers. Referring to FIG. 3, activity and 4-methyl-1-pentene incorporation with 2-Zr/MAO are seen to be proportional to comonomer concentration in ethylene/4-methyl-1-pentene copolymerizations (the temperature at which polymerization is conducted ($T_p$)=75° C.; 80 psi ethylene in toluene). The activity response of $Me_2Si(\eta^5$-2,3-$Me_2$-benz[e]Ind)($\eta^1$-N-$^t$Bu)TiCl$_2$/MAO is shown for comparison (Xu et al., Macromolecules 2001, 34:2040–2047). In neat comonomer, 4-methyl-1-pentene incorporation (>95%) is comparable to or greater than its feed fraction (ca. 94%). FIG. 4 illustrates a similar unyielding comonomer effect for ethylene/1-octene copolymerizations with 2-Zr/MAO, for which activities are even greater. Referring to FIG. 4, activity and 1-octene incorporation with I/MAO are proportional to comonomer concentration in ethylene/1-octene copolymerizations ($T_p$=75° C.; 80 psi ethylene in toluene). The activity response of $Me_2Si(\eta^5$-2-Me-benz[e]Ind)($\eta^1$-N-$^t$Bu)TiCl$_2$/MAO is shown for comparison (Xu et al., Macromolecules, vol. 31, pp. 4724–4729, 1998).

Thus it can be seen from the description above that the sterically expanded catalyst system of 2-Zr/MAO produces homopolymers and copolymers of α-olefins with unprecedented activities and incorporation rates. While not intending to be bound by theory, a tentative explanation to be investigated is that the spatial accessibility of 2-Zr renders a sterically indiscriminate catalyst and selectivity then defaults to electronic considerations, which favor coordination and insertion of the more electron rich α-olefins over ethylene.

Further details regarding the use of 2-Zr as a co-catalyst for olefin polymerization can be found in Irwin et al., J. Am. Chem. Soc., vol. 126, pp. 16716–16717, 2004, incorporated by reference herein.

EXAMPLE 3

This Example serves to illustrate the unprecedented syndioselectivity and syndiotactic polyolefin melting temperature achievable from a highly active, sterically expanded $\eta^1$-fluorenyl-$\eta^1$-amido zirconium complex, in accordance with some embodiments of the present invention.

$Me_2Si(\eta^1$-N-$^t$Bu)($\eta^1$-$C_{29}H_{36}$)ZrCl$_2$.OEt$_2$/MAO (2-Zr/MAO) has been shown by Applicants to have an inverted reactivity preference toward α-olefins vs. ethylene (Irwin et al., J. Am. Chem. Soc., vol. 126, pp. 16716–16717, 2004). This sterically expanded constrained geometry catalyst exhibits a novel $\eta^1$-C ligation (see Irwin et al., Polyhedron, vol. 24, pp. 1314–1324, 2005) and it rivals or excels the best attributes of each syndioselective predecessor: 1) ligand and complex syntheses are inexpensive and facile (starting with octamethyloctahydrodibenzofluorene ($C_{29}H_{38}$), 17 g of 2-Zr are readily synthesized in two flasks in two days in 32% overall yield); 2) 2-Zr/MAO is extremely active towards α-olefins—6 times more active in the homopolymerization of propylene than ethylene at 25° C.; 3) 2-Zr/MAO is thermally stable and catalytically active even up to 170° C.; and 4) the obtained polymers have unsurpassed syndiotacticity and unprecedented melting temperatures.

Figure 5:
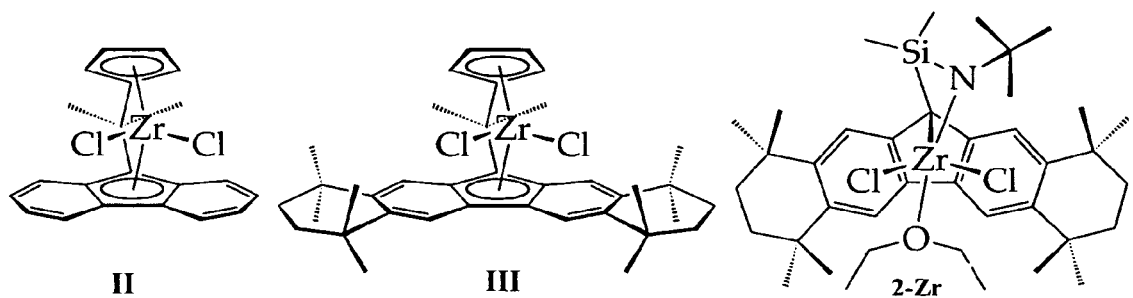
FIG. 5 depicts traditional catalysts II and III, as well as 2-Zr.

The results of the MAO-cocatalyzed propylene polymerizations with complex 2-Zr are compared with those of syndioselective ansa-metallocenes II and III (see FIG. 5) in Table 2. Aselective MAO-cocatalyzed systems IV ($Cp_2ZrCl_2$) and I ($Me_2Si(\eta^1$-N-$^t$Bu)($\eta^5$-$C_5Me_4$)TiCl$_2$)—heralded for its high activity in ethylene/α-olefin copolymerizations—are also included for comparative purposes. The data indicate that 2-Zr/MAO is superior with regard to activity, stereoselectivity, and polymer melting temperature, although lower molecular weights are observed.

TABLE 2

MAO-activated propylene polymerization results for II–V and 2-Zr[a]

| Catalyst (μmol) | $T_p$ (° C.) | Yield (g) | Activity[b] | $T_m$[c] (° C.) | [rrrr][d] % | $M_w$[e] | PDI[e] |
|---|---|---|---|---|---|---|---|
| II(1.62) | 0 | 0.32 | 2,400 | 151 | 91 | 209,200 | 2.47 |
| II(1.62) | 25 | 0.31 | 11,480 | 142 | 89 | 179,700 | 2.37 |
| II(1.62)[f] | 90 | 1.16 | 42,700 | 116 | 71 | 57,400 | 2.16 |
| III(1.53) | 0 | 0.23 | 1,830 | 157 | 96 | 495,400 | 2.56 |
| III(1.53) | 25 | 0.45 | 17,730 | 151 | 92 | 362,700 | 2.86 |
| III(1.53)[f] | 90 | 1.58 | 61,800 | am. | 64 | 116,800 | 2.31 |
| 2-Zr(1.66) | −15 | 1.08 | 1,310 | 165 | >99 | 58,600 | 2.25 |
| 2-Zr(1.66) | 0 | 0.54 | 3,890 | 164 | 98 | 46,200 | 1.98 |
| 2-Zr(1.66) | 25 | 1.07 | 38,670 | 157 | 96 | 35,700 | 2.17 |
| 2-Zr(1.66)[f] | 90 | 1.14 | 41,100 | 128 | 82 | 14,400 | 1.93 |
| IV(1.66) | 0 | 0.04 | 290 | am. | — | — | — |
| IV(1.66) | 25 | 0.04 | 1,450 | am. | — | — | — |
| V(1.66) | 0 | 0.29 | 2,100 | am. | 22 | — | — |
| V(1.66) | 25 | 0.34 | 12,140 | am. | — | — | — |

[a]Polymerization conditions: neat propylene (30 mL); 1000 eq. MAO; 30 min. run at $T_p$ = −15° C.; 5 min. runs at $T_p$ = 0° C.; 1 min. runs at $T_p$ = 25° C.
[b]kg PP/(mol M · h).
[c]Unannealed, determined by DSC; am. = amorphous.
[d][rrrr] % determined by $^{13}$C NMR.
[e]Average of two injections vs. PP.
[f]Polymerization conditions: 30 mL n-heptane; 1000 eq. MAO; 120 psi propylene; 10 min. pre-run equilibration; 1 min. run.

At $T_p$=25° C. 2-Zr/MAO is nearly four times as active as II/MAO, twice as active as III/MAO, but only 15% as active as Bercaw's best doubly-bridged metallocene system (i.e., $[(1,2-Me_2Si)_2\{\eta^5-C_5H_3\}\ \{\eta^5-C_5H-3,5-(CHMe_2)_2\}]ZrCl_2$, Veghini et al., J. Am. Chem. Soc., vol. 121, pp. 564–573, 1999). The data in Table 2 further reveal that increasing the temperature from 0° C. to 25° C. for MAO-cocatalyzed propylene polymerizations with II, IV, and I results in a 5-fold increase in activity; however, there is a 10-fold increase in activity for III/MAO and 2-Zr/MAO, both of which contain the bulky octamethyloctahydrodibenzofluorenyl ($C_{29}H_{36}$) moiety. While not intending to be bound by theory, such high activities are reportedly due to a decreased ability of the counteranion to approach a more sterically shrouded cationic metal center (Miller et al., Organometallics, vol. 23, pp. 1777–1789, 2004). Even at $T_p$=90° C. and low propylene concentration (120 psi in n-heptane), 2-Zr/MAO prevails with the highest $T_m$ (128° C.) and [rrrr] (82%) recorded under these conditions—even surpassing the doubly-bridged catalyst in neat propylene at $T_p$=70° C. ($T_m$=119° C., [rrrr]=79.5%) (e.g., $[(1,2-Me_2Si)_2\{\eta^5-C_5H_3\}\ \{\eta^5-C_5H-3,5-(CHMe_2)_2\}]ZrCl_2$, Veghini et al., J. Am. Chem. Soc. 1999, 121:564–573).

At $T_p$=0° C. 2-Zr/MAO produces s-PP with a melting point of 164° C., which is 13° C. higher than that of II/MAO, and at least 7° C. higher than the s-PP from the most syndioselective catalyst systems reported to date (e.g., bis [N-(3-(SiMe$_3$)salicylidene)-2,3,4,5,6-pentafluoroanilinato]-TiCl$_2$, Mitani et al., J. Am. Chem. Soc., vol. 124, pp. 7888–7889, 2002; Miller et al., Organometallics, vol. 23, pp. 1777–1789, 2004). Note that the reported $T_m$ of 170° C. for s-PP from a doubly-bridged metallocene is for the annealed polymer with [rrrr]=91% and the activity is quite low at the required $T_p$ of −60° C. (Grisi et al. J. Mol. Catal. A: Chem., vol. 140, pp. 225–233, 1999). Annealing this sample at 160° C. for 3 hours results in a melting point of 174° C. —only eight degrees below the theoretical maximum melting temperature of perfectly syndiotactic polypropylene (182° C.) (De Rosa et al., Macromolecules, vol. 31, pp. 6206–6210, 1998). Even polymer fractionation has not afforded samples of s-PP that approach these $T_m$ values (Fierro et al., J. Polym. Sci. A: Polym. Chem., vol. 32, pp. 661–673, 1994).

In an effort to maximize stereoselectivity, propylene was polymerized with 2-Zr/MAO at −15° C. yielding s-PP with a $T_m$ of 165° C. and an activity of 1,310 kg PP/(mol Zr·h). This is the highest melting s-PP of which the Applicants are aware, and it nearly matches the highest reported $T_m$ (166° C.) for an unfractionated, unannealed isotactic polypropylene. (For a general review of propylene polymerization via metallocene catalysts see: Resconi et al., Chem. Rev., vol. 100, pp. 1253–1345, 2000). Thus, s-PP produced with catalyst systems of the present invention melts at 96.3% (438K/455K) of the theoretical maximum $T_m$ for s-PP (182° C.) (De Rosa et al., Macromolecules, vol. 31, pp 6206–6210, 1998), while the best i-PP melts at only 95.6% (439K/459K) of the theoretical maximum $T_m$ for i-PP (186° C.) (Yamada et al., Macromolecules, vol. 36, pp 4790–4801, 2003).

Figure 6:
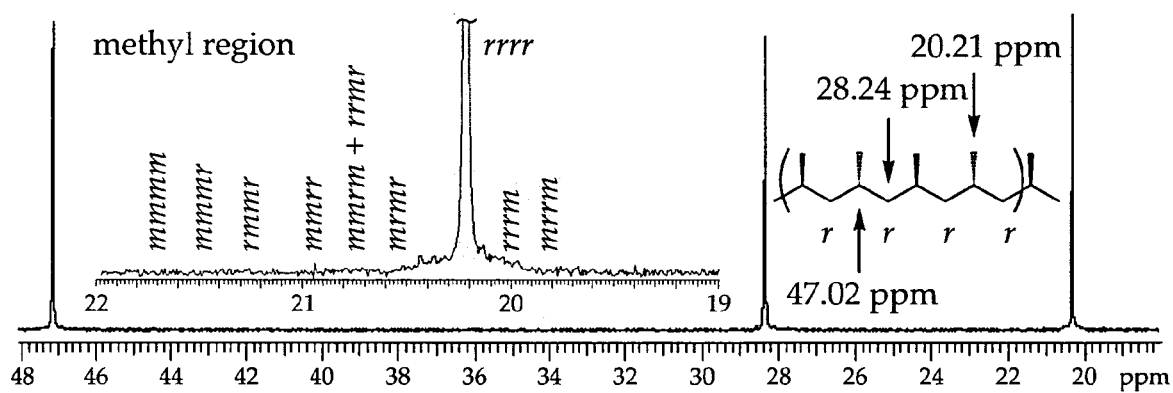
FIG. 6 is a $^{13}$C NMR spectrum (20,000 transients) of s-PP produced by 2-Zr/MAO at $T_p$=−15° C.; [rrrr]>99%; $T_m$=165° C., where the methyl region (inset) lacks visible stereoerrors.

FIG. 6 is a $^{13}C$ NMR spectrum (20,000 transients) of s-PP produced by 2-Zr/MAO at $T_p=-15°$ C.; [rrrr]>99%; $T_m=165°$ C. The methyl region (inset) lacks visible stereoerrors. FIG. 6 shows the $^{13}C$ NMR spectrum of the s-PP prepared by 2-Zr/MAO at −15° C. Not surprisingly, close inspection of the methyl region shows that the polymer is virtually devoid of stereoerrors. This high stereoregularity is largely responsible for the unparalleled melting temperature and physical form of the polymer which, unlike samples from II/MAO, is a fine, free-flowing powder that crystallizes from hot tetrachloroethane-$d_2$. With low monomer concentration (3.6 M) and a higher $T_p$ (45° C.), the stereoerrors observed by $^{13}C$ NMR ([rrmr]/[mmrr]=8) implicate site epimerization as the dominant stereochemical mistake. Enantiofacial selectivity remains nearly perfect at 99.7% ([mmrr]=0.6%).

TABLE 3

MAO-activated 4-methyl-1-pentene polymerization results for II, III, and 2-Zr.[a]

| Catalyst (μmol) | $T_p$ (° C.) | Yield (g) | Activity[b] | $T_m$[c] (° C.) | [rrrr][d] % |
|---|---|---|---|---|---|
| II(1.62) | 0 | 0.61 | 500 | 210 | 94 |
| II(1.62) | 25 | 0.17 | 420 | 206 | 93 |
| III(1.53) | 0 | 0.00 | 0 | — | — |
| III(1.53) | 25 | 0.03 | 80 | am. | — |
| 2-Zr(1.66) | 0 | 0.47 | 380 | 215 | 97 |
| 2-Zr(1.66) | 25 | 2.14 | 5,160 | 202 | 89 |

[a]Polymerization conditions: neat 4-methyl-1-pentene (25 mL); 1000 eq. MAO; 45 min. runs at $T_p$ = 0° C.; 15 min. runs at $T_p$ = 25° C.
[b]kg P4M1P/(mol M · h).
[c]Unannealed, determined by DSC; am. = amorphous.
[d][rrrr] % determined by $^{13}C$ NMR.

The syndioselective aptitude of 2-Zr/MAO is further exemplified in the homopolymerization of 4-methyl-1-pentene, as recounted in Table 3. At 25° C. the activity of 2-Zr/MAO is 12 times that of II/MAO. Polymerization by 2-Zr/MAO at 0° C. apparently yields the highest melting, most stereoregular sample of syndiotactic poly(4-methyl-1-pentene) yet prepared. The few reports of this polymer in the literature (from II/MAO) list a maximum $T_m$ of 210° C. and a [rrrr] pentad fraction of 95% (De Rosa et al., Macromolecules, vol. 25, pp 6938–6942, 1992; De Rosa et al., Macromolecules, vol. 31, pp 3163–3169, 1998), both of which have been surpassed by 2-Zr/MAO ($T_m=215°$ C., [rrrr]=97%). Note that sterically expanded III/MAO suffers from poor activity, providing a minuscule amount of amorphous polymer, but that 2-Zr/MAO, with a similar steric environment, is not likewise inhibited.

To summarize, Applicants have demonstrated that a structurally unique, sterically expanded $\eta^1$-fluorenyl-$\eta^1$-amido catalyst system (2-Zr/MAO) is strikingly active and syndioselective, affording syndiotactic polypropylene with unsurpassed stereoregularity ([rrrr]>99%) and polymer melting temperature ($T_m$ up to 165° C. or 174° C. upon annealing). Interestingly, 2-Zr/MAO is the only syndioselective catalyst capable of producing polypropylene with stereochemical fidelity and polymer melting temperature equaling that of the most highly engineered isoselective single-site olefin polymerization catalysts. The high activity and syndioselectivity of 2-Zr/MAO is further demonstrated in the polymerization of 4-methyl-1-pentene, resulting in the production of the highest melting, most syndiotactic sample of poly(4-methyl-1-pentene). Future work will focus on the preparation of crystalline copolymers with novel architectures via exploitation of both the extreme stereoselectivity and increased activity towards α-olefins demonstrated by this new structural subclass of single-site catalysts.

Further details regarding the use of 2-Zr as a co-catalyst for olefin polymerization can be found in Irwin et al., J. Am. Chem. Soc., vol. 126, pp. 16716–16717, 2005, incorporated by reference herein.

EXAMPLE 4

This Example serves to illustrate the synthesis of several $R_2Si(\eta''-C_{29}H_{36})(\eta^1-N-R')M'X_2.L$ organometallic complexes, in accordance with at least some embodiments of the present invention. For more detail on such syntheses see Irwin et al., Polyhedron, vol. 24, pp. 1314–1324, 2005, incorporated by reference herein.

Figure 7:
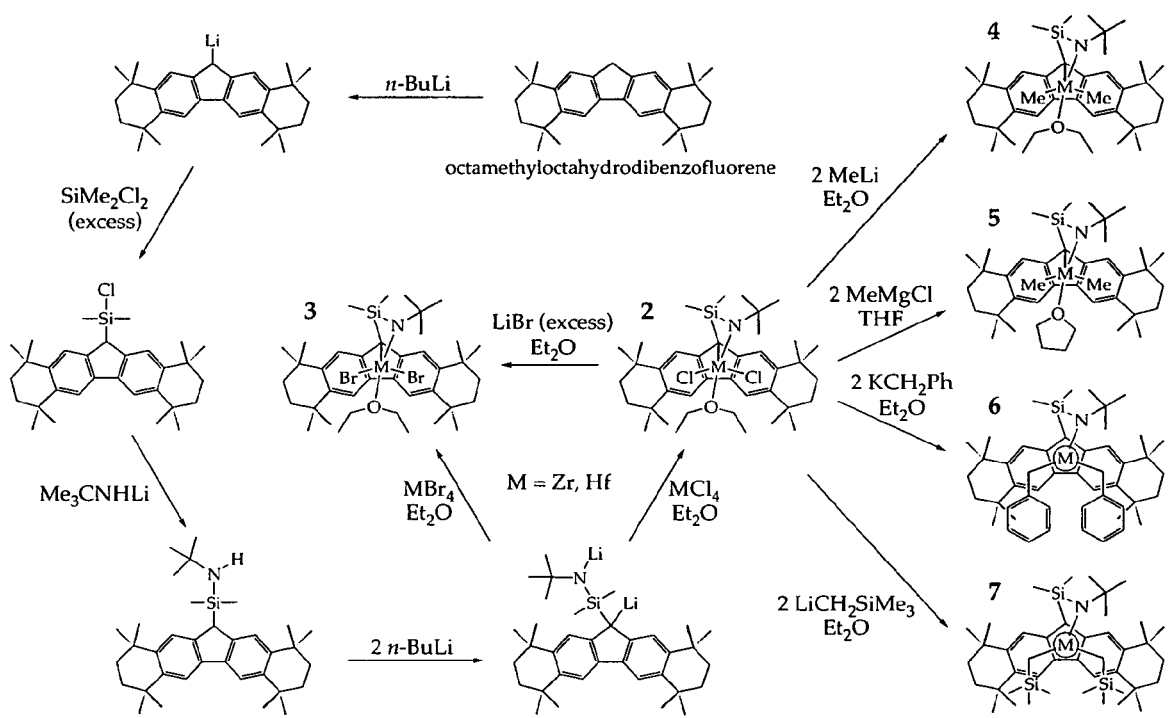
FIG. 7 (Scheme 2) depicts synthetic routes to zirconium (Zr) and hafnium (Hf) ansa-Oct-amido complexes 2–7.

Referring to FIG. 7, Scheme 3 depicts synthetic routes to zirconium and hafnium ansa-Oct-amido complexes 2–7. The synthesis of such zirconium and hafnium Oct-amido complexes parallels that of Okuda for the synthesis of zirconium fluorenyl-amido complexes (Okuda et al., Organometallics vol., 14 pp 789–795, 1995). Octamethyloctahydrodibenzofluorene (Guilhemat et al., Bull. Soc. Chim. Fr. Vol. 2, pp 334–344, 1980) is deprotonated with n-butyllithium (Miller et al., Organometallics vol. 23, pp 1777–1789, 2004; Miller et al., U.S. Pat. No. 6,469,188, 2002) and transferred into a hexane solution containing excess dimethyldichlorosilane. Subsequent reaction with $Me_3CNHLi$, followed by double deprotonation with n-butyllithium and combination with $ZrCl_4$ or $HfCl_4$ provides 2-Zr or 2-Hf. Interestingly, these five steps can be performed in two flasks (OctLi must be added to excess $SiMe_2Cl_2$), without isolation of the intermediates or their separation from salts, to yield 17 grams of 2-Zr as yellow microcrystals in 31.6% overall yield. The dibromide 3-Zr was obtained from $ZrBr_4$. Additionally, it is shown that 3-Zr and 3-Hf can be synthesized from the dichlorides 2-Zr and 2-Hf via direct halide exchange with an excess of LiBr in diethyl ether.

2-Zr and 2-Hf are readily derivatized with alkylating agents. The use of methyllithium with diethyl ether as solvent provides diethyl ether adducts 4-Zr and 4-Hf, whereas with methylmagnesium chloride in the presence of tetrahydrofuran, THF adducts 5-Zr and 5-Hf are obtained. The use of larger alkylating agents does not afford ethereal adducts. The dibenzyl species 6-Zr and 6-Hf are made from benzyl potassium and the bis(trimethylsilylmethyl) species 7-Zr and 7-Hf are made from trimethylsilylmethyllithium.

For the below-described syntheses, all air sensitive procedures were carried out under a purified atmosphere of nitrogen in a glove box equipped with a −35° C. freezer, or by using standard Schlenk line techniques. Solvents were dried and distilled under nitrogen into Straus flasks and stored until needed. Diethyl ether ($OEt_2$) and tetrahydrofuran (THF) were distilled from sodium/benzophenone; n-heptane and dichloromethane were distilled from calcium hydride; and toluene was distilled from elemental sodium.

The commercially available reagents n-butyllithium (Acros, 2.5 M in hexanes or Alfa Aesar, 2.87 M in hexanes), $LiCH_2SiMe_3$ (Aldrich, 1.0 M in pentane), MeLi (Aldrich, 1.6 M in diethyl ether), MeMgCl (Aldrich, 3.0 M in tetrahydrofuran), zirconium tetrachloride (Strem, 99.5+%), hafnium tetrachloride (Strem, 99.9+%), zirconium tetrabromide (Strem, 98%), and lithium bromide (Aldrich, 99.995+%) were used as received, unless otherwise noted. Both $KCH_2Ph$ (Schlosser et al., Angew. Chem. Int. Ed. 12 (1973) 508–509) and the ligand $Me_3CNHSiMe_2(C_{29}H_{37})$ (Irwin et al., J. Am. Chem. Soc. vol. 126, pp 16716–16717, 2004) were prepared according to literature procedures.

All NMR chemical shifts are given in ppm and were recorded on a Mercury-300BB spectrometer ($^1H$, 299.91 MHz; $^{13}C\{^1H\}$, 75.41 MHz) using the residual protonated solvent peak as an internal standard ($CDCl_3$: $^1H$, 7.27 ppm; $^{13}C$, 77.0 ppm. $C_6D_6$: $^1H$, 7.15 ppm; $^{13}C$, 128.0 ppm).

EXAMPLE 4.1

Synthesis of $Me_2Si(\eta^1-C_{29}H_{36})(\eta^1-N-^tBu)ZrCl_2.OEt_2$ (2-Zr)

In the glove box $Me_3CNHSiMe_2(C_{29}H_{37})$ (3.00 g, 6.26 mmol) was charged into a 100 mL pear-shaped round bottom and then attached to a 3 cm swivel frit. The frit was then evacuated and diethyl ether (50 mL) was vacuum transferred in. Next, n-butyllithium (5.51 mL, 13.77 mmol, 2.5 M in hexanes) was syringed in. The orange slurry was stirred for 20 hours and then the diethyl ether was removed under vacuum. $ZrCl_4$ (1.46 g, 6.26 mmol) was added in the glove box and diethyl ether (40 mL) was vacuum transferred in on the line. After slowly warming to room temperature and stirring the light brown slurry for 48 hours, the LiCl was filtered off and the cake was extracted until colorless. The slurry was concentrated to about 10 mL and the precipitated solid was collected by filtration. The cake was washed once to remove a brown oil and then evacuated until dry. This yielded 1.42 g (31.8%) of product as a neon yellow solid. Large rod-shaped crystals can be grown by cooling a saturated diethyl ether solution to −35° C. $^1H$ NMR ($C_6D_6$): δ 0.86 (s, 6H, $(CH_3)_2Si$), 1.10 (t, $^3J_{HH}$=7.0 Hz, 6H, ether-$CH_3$), 1.26 (s, 9H, —$C(CH_3)_3$), 1.28, 1.35, 1.38, 1.39 (s, 24H, Oct-$CH_3$), 1.62 (m, 8H, Oct-$CH_2$), 3.25 (q, $^3J_{HH}$=7.0 Hz, 4H, ether-$CH_2$), 8.01, 8.24 (s, 4H, Oct-$CH_1$). $^{13}C\{^1H\}$ NMR ($C_6D_6$) : δ 5.9, 15.5, 32.3, 32.6, 32.8, 32.9, 33.4, 34.95, 35.02, 35.3, 35.4, 56.4, 66.0, 71.9, 121.5, 123.2, 125.3, 134.8, 145.6, 148.9. Elemental Analysis: Calculated: C, 62.44%; H, 8.13%; N, 1.87%; Cl, 9.45%. Found: C, 61.40%; H, 8.24%; N, 1.81%; Cl, 9.45%.

EXAMPLE 4.2

Synthesis of $Me_2Si(\eta^1-C_{29}H_{36})(\eta^1-N-^tBu)HfCl_2.OEt_2$ (2-Hf)

2-Hf was prepared in a manner analogous to 2-Zr except that $HfCl_4$ (3.34 g, 10.43 mmol) was utilized yielding 3.30 g (39.5%) of 2-Hf as a yellow solid. $^1H$ NMR ($C_6D_6$): δ 0.84 (s, 6H, $(CH_3)_2Si$), 0.99 (t, $^3J_{HH}$=6.0 Hz, 6H, ether-$CH_3$), 1.31, 1.34, 1.39, 1.42 (s, 24H, Oct-$CH_3$), 1.37 (s, 9H, —$C(CH_3)_3$), 1.65 (app. s, 8H, Oct-$CH_2$), 3.19 (q, $^3J_{HH}$=6.0 Hz, 4H, ether-$CH_2$), 7.99, 8.22 (s, 4H, Oct-$CH_1$).

EXAMPLE 4.3

Synthesis of $Me_2Si(\eta^1-C_{29}H_{36})(\eta^1-N-^tBu)ZrBr_2.OEt_2$ (3-Zr)

3-Zr was prepared in a manner analogous to 2-Zr except that $ZrBr_4$ (2.57 g, 6.26 mmol) was utilized yielding 1.30 g (24.8%) of 3-Zr as a bright yellow powder. Large rod-shaped crystals can be grown by cooling a saturated diethyl ether solution to −35° C. $^1H$ NMR ($C_6D_6$): δ 0.86 (s, 6H, $(CH_3)_2Si$), 1.11 (t, $^3J_{HH}$=7.0 Hz, 6H, ether-$CH_3$), 1.27, 1.34, 1.39, 1.41 (s, 24H, Oct-$CH_3$), 1.31 (s, 9H, —$C(CH_3)_3$), 1.61 (m, 8H, Oct-$CH_2$), 3.26 (q, $^3J_{HH}$=7.0 Hz, 4H, ether-$CH_2$), 8.01, 8.27 (s, 4H, Oct-$CH_1$). $^{13}C\{^1H\}$ NMR ($C_6D_6$): δ 5.8, 15.5, 32.1, 32.7, 33.0, 34.98, 35.0, 35.3, 35.4, 56.9, 65.9, 72.0, 122.0, 124.0, 126.0, 134.6, 146.0, 148.8.

4.4 Synthesis of $Me_2Si(\eta^1-C_{29}H_{36})(\eta^1-N-^tBu)HfBr_2.OEt_2$ (3-Hf)

In the glove box, 2-Hf (0.13 g, 0.16 mmol) was charged into a 100 mL pear-shaped round bottom flask followed by the addition of anhydrous LiBr (4.90 g, 56.42 mmol). Next, the flask was attached to a 3 cm swivel frit and brought out to the line where diethyl ether (60 mL) was vacuum transferred in. The slurry was then stirred for 2 days after which time the solvent was removed under vacuum and pentane (30 mL) was vacuum transferred in. All insoluble material was removed via filtration and the cake was extracted until colorless. Concentration of the filtrate to 5 mL followed by filtration yielded 0.07 g (69.0%) of 3-Hf as an orange-yellow powder. Large rod-shaped crystals can be grown by cooling a saturated diethyl ether solution to −35° C. X-ray crystallography suggested that complete salt metathesis of the Hf—Cl bonds had been achieved. This was further supported by $^1H$ NMR via a characteristic shift of the aromatic Oct-CH, protons from 8.22 ppm (2-Hf) to 8.26 ppm (3-Hf). A similar shift is observed between 2-Zr and 3-Zr. $^1H$ NMR ($C_6D_6$): δ 0.89 (s, 6H, $(CH_3)_2Si$), 1.03 (t, $^3J_{HH}$=6.0 Hz, 6H, ether-$CH_3$), 1.28, 1.31, 1.35, 1.36 (s, 24H, Oct-$CH_3$), 1.32 (s, 9H, —$C(CH_3)_3$), 1.63 (m, 8H, Oct-$CH_2$), 3.19 (q, $^3J_{HH}$=6.0 Hz, 4H, ether-$CH_2$), 8.00, 8.26 (s, 4H, Oct-$CH_1$).

4.5 Synthesis of $Me_2Si(\eta^1-C_{29}H_{36})(\eta^1-N-^tBu)ZrMe_2.OEt_2$ (4-Zr)

In the glove box 2-Zr (0.50 g, 0.67 mmol) was charged into a 100 mL pear-shaped round bottom flask, which was then attached to a 3 cm swivel frit. The frit was evacuated on the vacuum line and diethyl ether (50 mL) was then vacuum transferred in. Next, a LiBr-free diethyl ether solution of $CH_3Li$ (0.83 mL, 1.33 mmol, 1.6 M in diethyl ether) was slowly syringed into the yellow solution while vigorously stirring. The solution began to bleach and acquire a very pale fluorescent yellow color. (Note: Extended exposure to excess $CH_3Li$ leads to a dark brown/black solution and complete decomposition of the product in a matter of hours.) After 2 hours the precipitated LiCl was removed via filtration and extracted until colorless. Concentration of the filtrate to 10 mL and collection of the precipitated product on the frit led to 0.42 g (89.0%) of product as a pale yellow solid. $^1$H NMR (C$_6$D$_6$): δ −0.59 (s, 6H, Zr(CH$_3$)$_2$), 0.89 (s, 6H, (CH$_3$)$_2$Si), 1.10 (t, $^3J_{HH}$=7.0 Hz, 6H, ether-CH$_3$), 1.32, 1.37 (s, 24H, Oct-CH$_3$), 1.33 (s, 9H, —C(CH$_3$)$_3$), 1.64 (m, 8H, Oct-CH$_2$), 3.24 (q, $^3J_{HH}$=7.0 Hz, 4H, ether-CH$_2$), 7.93, 8.23 (s, 4H, Oct-CH$_1$). $^{13}$C {$^1$H} NMR (C$_6$D$_6$): δ 6.6, 15.5, 32.6, 32.8, 32.9, 33.2, 34.5, 34.8, 35.2, 35.55, 35.57, 39.4, 55.0, 65.9, 70.8, 120.6, 122.7, 123.7, 135.0, 142.6, 146.7.

EXAMPLE 4.6

Synthesis of Me$_2$Si(η$^1$-C$_{29}$H$_{36}$)(η$^1$-N-$^t$Bu) HfMe$_2$.OEt$_2$ (4-Hf)

4-Hf was prepared in a manner analogous to 4-Zr except that 2-Hf (0.40 g, 0.49 mmol) was utilized yielding 0.23 g (60.5%) of 4-Hf as a pale yellow powder. $^1$H NMR (C$_6$D$_6$): δ −0.16 (s, 6H, Hf(CH$_3$)$_2$), 0.84 (s, 6H, (CH$_3$)$_2$Si), 1.02 (t, $^3J_{HH}$=6.0 Hz, 6H, ether-CH$_3$), 1.34, 1.35, 1.36, 1.38 (s, 24H, Oct-CH$_3$), 1.37 (s, 9H, —C(CH$_3$)$_3$), 1.66 (app. s, 8H, Oct-CH$_2$), 3.17 (q, $^3J_{HH}$=6.0 Hz, 4H, ether-CH$_2$), 7.84, 8.21 (s, 4H, Oct-CH$_1$).

4.7 Synthesis of Me$_2$Si(η$^1$-C$_{29}$H$_{36}$)(η$^1$-N-$^t$Bu) ZrMe$_2$.THF (5-Zr)

In the glove box, 2-Zr (5.00 g, 6.67 mmol) was charged into a 100 mL pear-shaped round bottom flask. The flask was then attached to a 3 cm swivel frit and diethyl ether (80 mL) was vacuum transferred in on the line. Next, while the flask was still cold, MeMgCl (4.44 mL, 13.33 mmol, 3.0 M in THF) was slowly added via syringe. A large quantity of white precipitate immediately formed. The contents of the flask were stirred for 2 hours before the precipitated salt was removed by filtration. The cake was extracted until the eluent was colorless. The solvent was then removed under vacuum and the frit was brought into the box where the off-white product was recrystallized by cooling a saturated diethyl ether solution to −35° C., yielding 2.98 g (63.0%) of product as nearly white crystals which were suitable for X-ray diffraction. $^1$H NMR (C$_6$D$_6$): δ 0.02 (s, 6H, Zr(CH$_3$)$_2$), 0.77 (s, 6H, (CH$_3$)$_2$Si), 1.14 (br, 4H, THF-CH$_2$), 1.34, 1.37, 1.40, 1.43 (s, 24H, Oct-CH$_3$), 1.52 (s, 9H, —C(CH$_3$)$_3$), 1.69 (m, 8H, Oct-CH$_2$), 2.81 (br, 4H, THF-CH$_2$), 7.82, 8.15 (s, 4H, Oct-CH$_1$). $^{13}$C {$^1$H} NMR (C$_6$D$_6$): δ 3.9, 15.5, 32.6, 32.7, 32.9, 33.3, 34.5, 34.8, 35.0, 35.9, 36.0, 39.7, 57.2, 65.8, 86.3, 117.4, 118.5, 133.6, 137.6, 139.7, 141.9.

EXAMPLE 4.8

Synthesis of Me$_2$Si(η$^1$-C$_{29}$H$_{36}$)(η$^1$-N-$^t$Bu) HfMe$_2$THF (5-Hf)

5-Hf was prepared in a manner analogous to 5-Zr except that 2-Hf (0.43 g, 0.54 mmol) was utilized yielding 0.43 g of 5-Hf as an off-white solid (>95% yield, some persistent THF). $^1$H NMR (C$_6$D$_6$): δ 0.29 (s, 6H, Hf(CH$_3$)$_2$), 0.70 (s, 6H, (CH$_3$)$_2$Si), 1.01 (br, 4H, THF-CH$_2$), 1.33, 1.40, 1.45, 1.48 (s, 24H, Oct-CH$_3$), 1.67 (s, 9H, —C(CH$_3$)$_3$), 1.73 (m, 8H, Oct-CH$_2$), 2.41 (br, 4H, THF-CH$_2$), 7.67, 8.13 (s, 4H, Oct-CH$_1$). $^{13}$C {$^1$H} NMR (C$_6$D$_6$): δ 3.8, 15.9, 25.8, 33.0, 33.03, 33.3, 33.7, 34.9, 35.4, 35.5, 36.2, 36.4, 51.4, 66.2, 71.6, 117.5, 118.8, 126.6, 133.8, 137.9, 142.0.

4.9 Synthesis of Me$_2$Si(η$^5$-C$_{29}$H$_{36}$)(η$^1$-N-$^t$Bu)Zr (CH$_2$Ph)$_2$ (6-Zr)

In the glove box, 2-Zr (4.00 g, 5.33 mmol) was charged into a 100 mL pear-shaped round bottom flask followed by the addition of KCH$_2$Ph (1.39 g, 10.66 mmol). The flask was then attached to a 3 cm swivel frit and brought out onto the line where diethyl ether (60 mL) was vacuum transferred in. The contents were allowed to slowly warm to room temperature and then stir for 2 hours before the salt was removed by filtration and the cake extracted until colorless. Concentration of the slurry to 20 mL, followed by filtration, led to the desired product as a yellow solid (3.21 g, 76.5%). Large block-like crystals were grown by the vapor diffusion of diethyl ether into dichloromethane saturated with 6-Zr. $^1$H NMR (C$_6$D$_6$): δ −0.48, 0.86 (d, $^2J_{HH}$=10.5 Hz, 4H, Zr—CH$_2$), 0.99 (s, 9H, —C(CH$_3$)$_3$), 1.01 (s, 6H, (CH$_3$)$_2$Si), 1.34, 1.38, 1.39, 1.42 (s, 24H, Oct-CH$_3$), 1.62 (m, 8H, Oct-CH$_2$), 6.69 (m, 4H, Zr—CH$_2$C$_6$H$_5$), 6.89 (m, 2H, Zr—CH$_2$C$_6$H$_5$), 7.16 (m, 4H, Zr—CH$_2$C(H$_5$), 8.15, 8.16 (s, 4H, Oct-CH$_1$). $^{13}$C {$^1$H} NMR (CDCl$_3$): δ 6.2, 32.4, 32.6, 32.8, 33.0, 33.5, 34.8, 35.06, 35.08, 35.09, 56.9, 61.3, 73.1, 119.8, 121.2, 122.2, 123.1, 127.5, 128.8, 133.4, 143.5, 145.5, 146.8. $^{13}$C {$^1$H} NMR (C$_6$D$_6$): δ 6.4, 32.57, 32.6, 33.06, 33.1, 33.6, 34.9, 35.2, 35.26, 35.3, 57.2, 61.9, 73.9, 120.1, 122.0, 122.7, 123.6, 128.3, 129.3, 134.1, 143.7, 145.7, 147.0

EXAMPLE 4.10

Synthesis of Me$_2$Si(η$^5$-C$_{29}$H$_{36}$)(η$^1$-N-$^t$Bu)Hf (CH$_2$Ph)$_2$ (6-Hf)

6-Hf was prepared in a manner analogous to 6-Zr except that 2-Hf (1.50 g, 1.87 mmol) was utilized yielding 0.42 g (25.8%) of 6-Hf as a yellow-orange solid. Large block-like crystals were grown by the vapor diffusion of diethyl ether into dichloromethane saturated with 6-Hf. $^1$H NMR (C$_6$D$_6$): δ −0.30, 0.66 (d, $^2J_{HH}$=7.2 Hz, 4H, Hf—CH$_2$), 0.95 (s, 6H, (CH$_3$)$_2$Si), 1.01 (s, 9H, —C(CH$_3$)$_3$), 1.33, 1.34, 1.35, 1.36 (s, 24H, Oct-CH$_3$), 1.57 (m, 8H, Oct-CH$_2$), 6.65 (m, 4H, Hf—CH$_2$C$_6$H$_5$), 6.82 (m, 2H, Hf—CH$_2$C$_6$H$_5$), 7.12 (m, 4H, Hf—CH$_2$C$_6$H$_5$), 8.04, 8.26 (s, 4H, Oct-CH$_1$). $^{13}$C {$^1$H} NMR (CDCl$_3$): δ 6.2, 32.5, 32.6, 33.0, 33.6, 33.7, 34.9, 35.0, 35.08, 35.1, 55.9, 70.4, 71.4, 120.0, 121.1, 122.4, 122.7, 127.5, 128.0, 134.1, 143.5, 146.5, 147.4.

EXAMPLE 4.11

Synthesis of Me$_2$Si(η$^5$-C$_{29}$H$_{36}$)(η$^1$-N-$^t$Bu)Zr (CH$_2$SiMe$_3$)$_2$ (7-Zr)

In the glove box, 2-Zr (0.50 g, 0.67 mmol) was charged into a 100 mL pear-shaped round bottom flask. The flask was then attached to a 3 cm swivel frit and brought out to the vacuum line where pentane (50 mL) was vacuum transferred in. Next, LiCH$_2$SiMe$_3$ (1.40 mL, 1.40 mmol, 1.0 M in pentane) was slowly syringed into the still cold solution in the flask. The contents were allowed to stir for one hour before the LiCl was removed by filtration and the salt was extracted until colorless. The solvent was removed under vacuum yielding a yellow foam. This was brought into the box where 5 mL of pentane was added causing the precipitation of a neon yellow powder. The solvent was decanted and the powder collected and dried under vacuum yielding 0.35 g (67.0%) of 7-Zr. Pentane (5 mL) was then saturated with 7-Zr and stored in a −35° C. freezer for one month, resulting in the formation of large block-like crystals. $^1$H NMR (C$_6$D$_6$): δ −1.32, −0.77 (d, $^2J_{HH}$=12.3 Hz, 4H, Zr—CH$_2$), 0.17 (s, 18H, —Si(CH$_3$)$_3$), 0.89 (s, 6H, (CH$_3$)$_2$Si), 1.31 (s, 9H, —C(CH$_3$)$_3$), 1.39, 1.41, 1.41, 1.49 (s, 24H, Oct-CH$_3$), 1.68 (m, 8H, Oct-CH$_2$), 7.92, 8.17 (s, 4H, Oct-CH$_1$). $^{13}$C {$^1$H} NMR (CDCl$_3$): δ 3.3, 6.3, 32.2, 32.9, 33.1, 33.3, 34.3, 34.9, 35.08, 35.1, 35.3, 55.0, 55.9, 71.1, 120.1, 122.5, 123.2, 133.9, 142.7, 146.1.

EXAMPLE 4.12

Synthesis of Me$_2$Si($\eta^5$-C$_{29}$H$_{36}$)($\eta^1$-N-$^t$Bu)Hf(CH$_2$SiMe$_3$)$_2$ (7-Hf)

7-Hf was prepared in a manner analogous to 7-Zr except that 2-Hf (0.40 g, 0.49 mmol) was utilized yielding 0.24 g (54.5%) of 7-Hf as a yellow powder. $^1$H NMR (CDCl$_3$): δ −2.09, −1.38 (d, $^2J_{HH}$=12.0 Hz, 4H, Hf—CH$_2$), −0.11 (s, 18H, —Si(CH$_3$)$_3$), 0.89 (s, 6H, (CH$_3$)$_2$Si), 1.33, 1.35, 1.46, 1.49 (s, 24H, Oct-CH$_3$), 1.37 (s, 9H, —C(CH$_3$)$_3$), 1.79 (app. s, 8H, Oct-CH$_2$), 7.72, 8.02 (s, 4H, Oct-CH$_1$).

EXAMPLE 5

This Example serves to illustrate X-ray crystallography studies of Zr and Hf complexes synthesized in EXAMPLE 4.

In carrying out the below-described crystallography studies, crystals were mounted at room temperature in mineral oil, and affixed to a glass fiber. X-ray crystallographic data were obtained using a Bruker SMART 1000 three-circle diffractometer operating at 50 kV and 40 mA, Mo Kα (λ=0.71073 Å) with a graphite monochromator and a CCD-PXL-KAF2 detector or a Bruker GADPS instrument operating at 40 kV and 40 mA, Cu Kα (λ=1.54578 Å) with a graphite monochromator and a CCD-PXL-KAF2 detector. The molecular structures were solved by direct methods and were refined employing the SHELXS-97 and SHELXL-97 programs (G. M. Sheldrick, SHELXS-97 and SHELXL-97, programs for the solution of crystal structures, Universität Göttingen, 1997).

Figure 8:
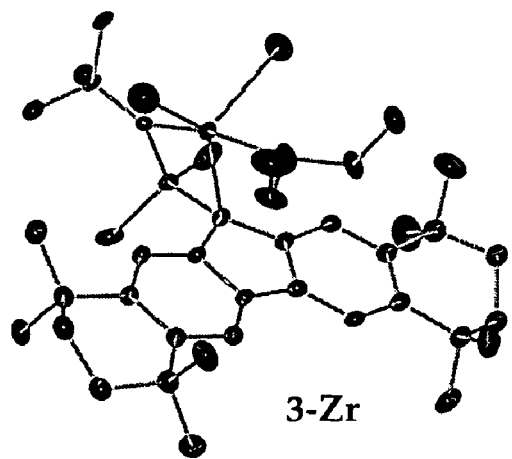
FIG. 8 depicts X-ray structures of 3-Zr, 3-Hf, 5-Zr, 6-Zr, 6-Hf, and 7-Zr with thermal ellipsoids drawn at 50% probability and where hydrogen atoms have been omitted.
Figure 8:
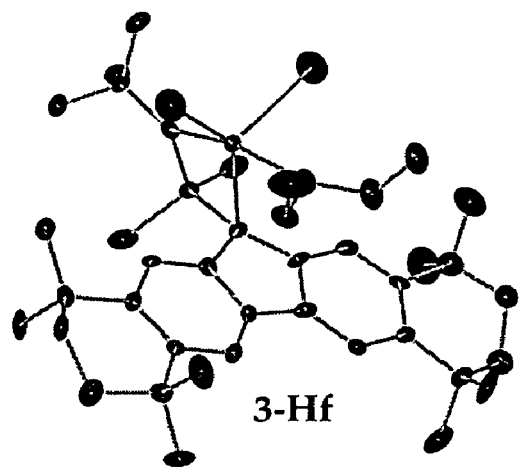
Figure 8:
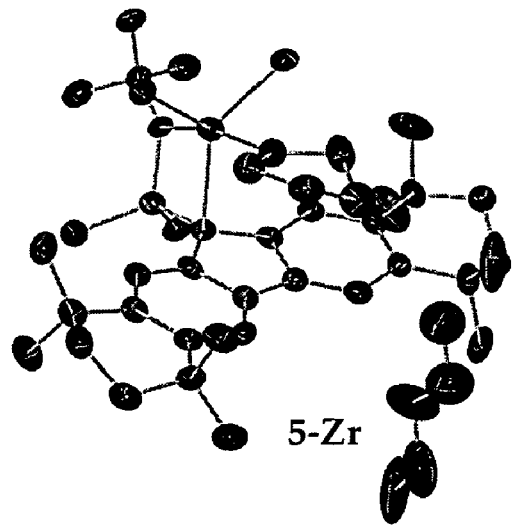
Figure 8:
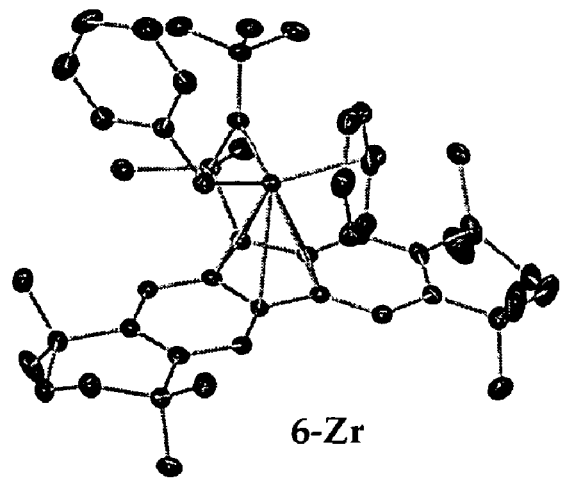
Figure 8:
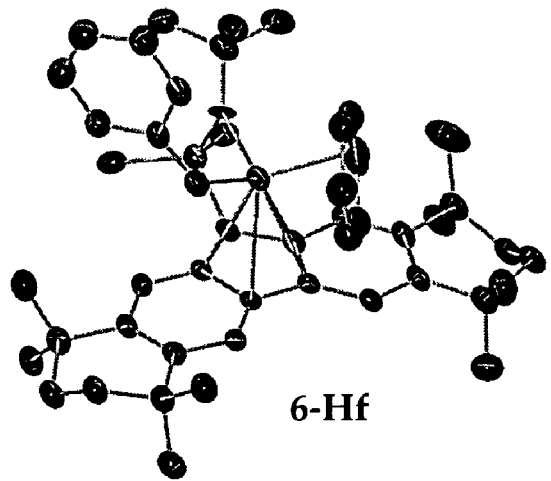
Figure 8:
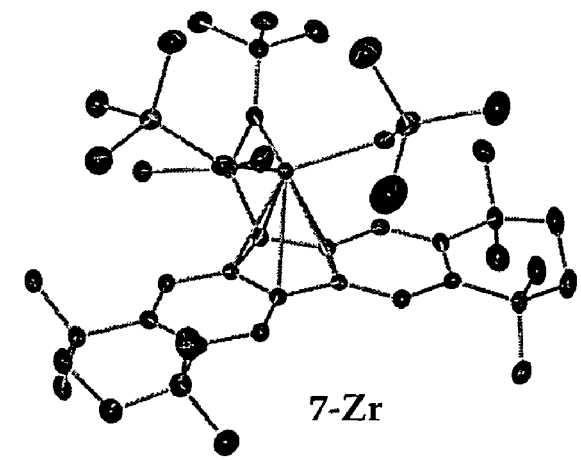

Crystals suitable for X-ray crystallography were obtained for complexes 3-Zr, 3-Hf, and 5-Zr by cooling saturated diethyl ether solutions. Crystals of 6-Zr and 6-Hf were grown by vapor diffusion of diethyl ether into saturated dichloromethane solutions, while crystals of 7-Zr were obtained by cooling a saturated pentane solution. FIG. 8 depicts the structural results of the X-ray crystallography for 3-Zr, 3-Hf, 5-Zr, 6-Zr, 6-Hf, and 7-Zr, with thermal ellipsoids drawn at 50% probability and hydrogen atoms omitted.

It is readily apparent that ethereal solvents remain bound to the metal in 3-Zr, 3-Hf, and 5-Zr, resulting in a trigonal bipyramid with oxygen and nitrogen in the apical positions. This trigonal bipyramid structure is unprecedented for fluorenyl-amido complexes; even the remarkably similar Me$_2$Si($\eta^5$-2,7-$^t$Bu$_2$—C$_{13}$H$_6$) ($\eta^1$-N-$^t$Bu)ZrCl$_2$ (Razavi, U.S. Pat. No. 6,448,349, 2002; Razavi et al., Macromolecular Symposia vol. 213, pp 157–171, 2004) and Me$_2$Si($\eta^5$-3,6-$^t$Bu$_2$-C$_{13}$H$_6$)($\eta^1$-N-$^t$Bu)ZrCl$_2$ (Razavi et al., J. Organomet. Chem. vol. 621, pp. 267–276, 2001; Razavi et al., in Organometallic Catalysts and Olefin Polymerization, R. Blom, A. Follestad, E. Rytter, M. Tilset, M. Ystenes, Eds., Springer, Berlin, 2001, 267–279) adopt the $\eta^5$, pseudotetrahedral geometry. Apparently there is an important difference between a 2,3,6,7-tetra-substituted fluorenyl ligand (Oct) and a di-substituted fluorenyl ligand. 3-Zr and 3-Hf are isomorphic, and only 5-Zr cocrystallizes with solvent, packing one diethyl ether molecule into the cleft of each Oct ligand. In this case, note the selectivity of the metal to bind THF despite the use of diethyl ether as the crystallization solvent.

6-Zr, 6-Hf, and 7-Zr, which bear the larger benzyl or trimethylsilylmethyl groups, crystallize as ether-free species with a pseudotetrahedral coordination sphere and $\eta^5$ ligation to Oct. 6-Zr and 6-Hf are isomorphic and each of these structures contains one benzyl group that is arguably $\eta^2$. The M-CH$_2$Ph bond length is 2.295 Å for 6-Zr (2.299 Å for 6-Hf) and the M-(C$_{ipso}$) distance is 2.793 Å for 6-Zr (2.871 Å for 6-Hf). The structure of 7-Zr is quite similar to that published for the parent fluorenyl-containing compound, Me$_2$Si($\eta^5$-C$_{13}$H$_8$)($\eta^1$-N-$^t$Bu)Zr(CH$_2$SiMe$_3$)$_2$ (Okuda et al., Organometallics 14 (1995) 789–795).

Table 4 lists selected bond lengths and angles for 2-Zr (Irwin, et al., J. Am. Chem. Soc. 126 (2004) 16716–16717), 3-Zr, 3-Hf, 5-Zr, 6-Zr, 6-Hf, and 7-Zr. In the $\eta^1$ trigonal bipyramidal structures, the metal-C(1) bond lengths are consistently shorter (2.281 Å–2.330 Å) than the corresponding bond lengths in the $\eta^5$ pseudotetrahedral structures (2.373 Å–2.397 Å). The shortening of the remaining M-C bond upon $\eta^5$ to $\eta^1$ ring-slip is typical for cyclopentadienyl (Calderon et al., J. Am. Chem Soc. 91 (1969) 2528–2535) and indenyl ligands (C. Sui-Seng, G. D. Enright, D. Zargarian, Organometallics 23 (2004) 1236–1246). In ansa-metallocenes and cyclopentadienyl-amido complexes, the C$_{5centroid}$-C(1)-Si angle is always less than 180°; examples are rac-Me$_2$Si($\eta^5$-C$_9$H$_6$)$_2$ZrCl$_2$ (163.7°) (Dang et al., Organometallics vol. 18, pp. 3781–3791, 1999) and Me$_2$Si($\eta^5$-C$_5$Me$_4$)($\eta^5$-N-$^t$Bu)TiCl$_2$ (152.30) (Zemánek et al., Collect. Czech. Chem. Commun. vol. 66, pp 605–620, 2001). For the 775 complexes in Table 4, this angle is ~156°, a typical value. Strikingly, the C$_{5centroid}$-C(1)-Si angles for the $\eta^1$ complexes are considerably larger than 180° and range from 197.9° to 204.9°. Thus, the silicon atom and the metal are on opposite sides of the Oct ligand. This results in the most sterically open class of CGCs reported.

TABLE 4

Selected bond lengths (Å) and angles (°)

| Complex | M-C(1) | M-N | M-X(1) | M-X(2) | M-O | cent-C(1)-Si[a] | Si-N-M | X-M-X | N-M-O |
|---|---|---|---|---|---|---|---|---|---|
| 2-Zr (Cl$_2$•Et$_2$O) | 2.299(7) | 2.013(5) | 2.4155(19) | 2.3918(18) | 2.330(5) | 203.67 | 99.1(2) | 112.92(7) | 169.87(19) |
| 3-Zr (Br$_2$•Et$_2$O) | 2.300(8) | 2.019(6) | 2.5427(13) | 2.5387(13) | 2.322(6) | 202.78 | 99.0(3) | 112.31(5) | 169.6(2) |
| 3-Hf (Br$_2$•Et$_2$O) | 2.281(8) | 2.022(7) | 2.5112(14) | 2.4974(15) | 2.297(6) | 204.90 | 98.8(3) | 111.93(5) | 167.1(3) |
| 5-Zr (Me$_2$•THF) | 2.330(5) | 2.068(4) | 2.240(6) | 2.274(5) | 2.280(4) | 197.86 | 99.3(2) | 111.8(2) | 167.05(16) |
| 6-Zr ((CH$_2$Ph)$_2$) | 2.397(2) | 2.052(2) | 2.295(2) | 2.316(2) | — | 156.80 | 103.47(9) | 116.20(9) | — |
| 6-Hf ((CH$_2$Ph)$_2$) | 2.373(1) | 2.087(8) | 2.299(9) | 2.305(11) | — | 155.80 | 99.9(4) | 111.6(4) | — |
| 7-Zr ((CH$_2$SiMe$_3$)$_2$) | 2.390(2) | 2.0648(18) | 2.249(2) | 2.265(2) | — | 156.46 | 102.85(9) | 107.30(8) | — |

[a]cent is defined as the centroid of the five-membered ring of the Oct ligand.

EXAMPLE 6

This Example is illustrative of hapticity analyses of Zr and Hf complexes of EXAMPLE 4 by X-ray crystallography While $\eta^5$-fluorenyl ligands are the most common (J. A. Ewen et al., J. Am. Chem. Soc. vol. 110, pp 6255–6256, 1988; Razavi et al., in Ziegler Catalysts, Recent Scientific Innovations and Technological Improvements, G. Fink, R. Mülhaupt, H.-H. Brintzinger, Eds., Springer, Berlin, 1995, 111–147; Resconi et al., Chem. Rev. vol. 100, pp 1253–1345, 2000; Kirillov et al., Organometallics vol. 22, pp 4038–4046, 2003; Hakansson et al., Organometallics vol. 17, pp. 1208–1214, 1998), a number of $\eta^3$-fluorenyl examples have also been documented (Kowala et al., J. Chem. Soc. Chem. Comm. vol. 23, pp 993–994, 1974; Kowala, J. Wunderlich, Acta Cryst. vol. B32, pp 820–823, 1976; Andell et al., Polyhedron vol. 8, pp 203–209, 1989; Bochmann et al., Organometallics vol. 12, pp 4718–4720, 1993; Calhorda et al., Organometallics vol 18, pp 3956–3958, 1999; Calhorda et al., New J. Chem. vol. 26, pp 1552–1558, 2002. In contrast, $\eta^1$-fluorenyl ligands are quite rare. The first definitive examples were found with octahedral mid-transition metal species such as $Mn(\eta^1\text{-}C_{13}H_9)(CO)_3(P(n\text{-}Bu)_3)_2$ (Ji et al, Organometallics vol. 3, pp 745–750, 1984), $Mn(\eta^1\text{-}C_{13}H_9)(CO)_3(PEt_3)_2$ (Biagioni et Organometallics vol. 9, pp 547–551, 1990), and $Re(\eta^1\text{-}C_{13}H_9)(CO)_5$ (Young, J. Am. Chem. Soc. vol. 112, pp 1529–1537, 1990; Mejdrich et al., Synth. React. Inorg. Met.-Org. Chem. vol. 28, pp 953–973, 1998. Later, examples were found with early transition metal species such as pseudotetrahedral $(\eta^5\text{-}C_5H_4Me)_2Zr(\eta^1\text{-}C_{13}H_9)Cl$, $(\eta^5\text{-}C_5H_5)_2Zr(\eta^1\text{-}C_{13}H_9)_2$ (Schmid et al., J. Organomet. Chem. vol. 541, pp 3–7, 1997), and pseudotrigonal bipyramidal $Me_2C(\eta^5\text{-}C_5H_4)(\eta^{-C}{}_{13}H_8)TaMe_3$ (P. J. Chirik, Ph.D. Thesis, Calif. Institute of Technology, 2000).

Figure 9:
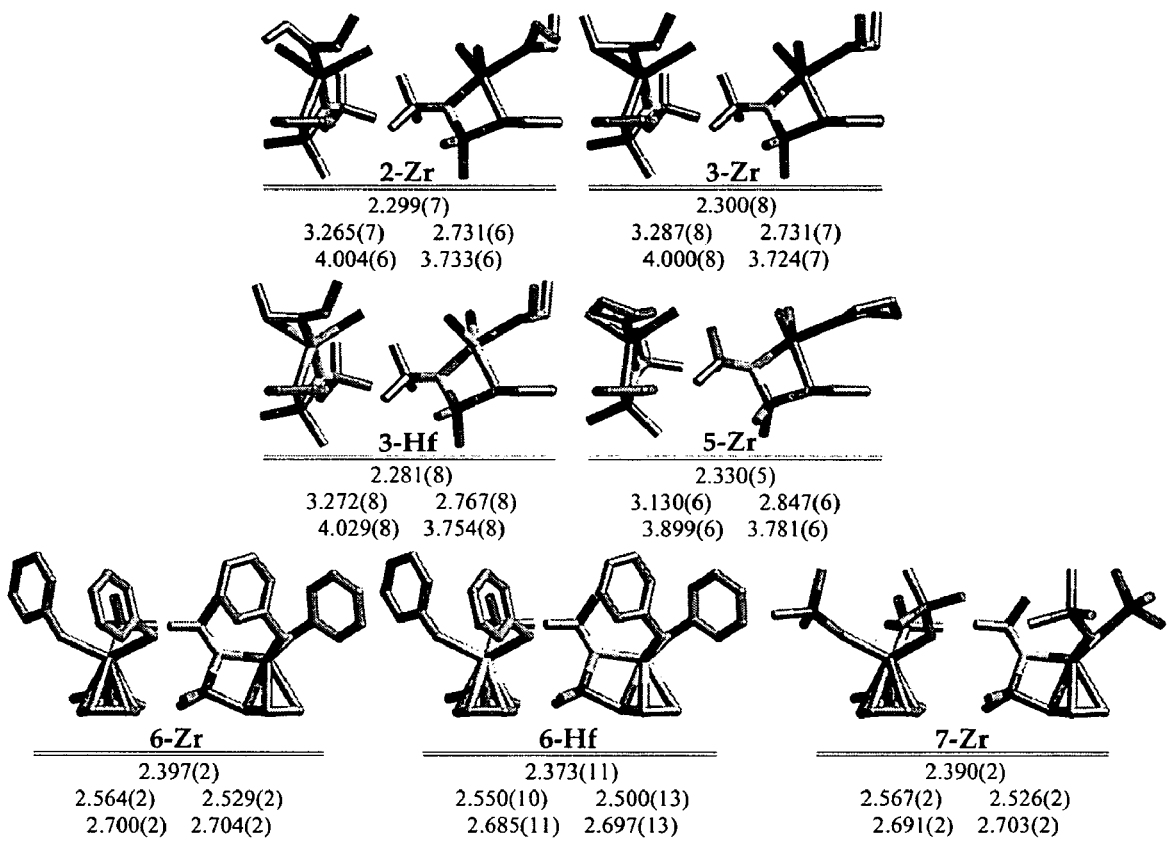
FIG. 9 depicts structures of 2-Zr, 3-Zr, 3-Hf, 5-Zr, 6-Zr, 6-Hf, and 7-Zr with the Oct ligand truncated to the five-membered ring, and where bond lengths and interatomic distances (Å) correspond to the metal-Oct interaction, moving clockwise from the C(1) carbon.

FIG. 9 depicts structures of 2-Zr, 3-Zr, 3-Hf, 5-Zr, 6-Zr, 6-Hf, and 7-Zr with the Oct ligand truncated to the five-membered ring. Bond lengths and interatomic distances (Å) correspond to the metal-Oct interaction, moving clockwise from the C(1) carbon. While the assignment of hapticity can sometimes be arbitrary (O'Connor et al., Chem. Rev. vol. 87, pp 307–318, 1987), the metrical parameters cataloged in FIG. 9 largely support the conclusion that 2-Zr, 3-Zr, 3-Hf, and 5-Zr are $\eta^1$, while 6-Zr, 6-Hf, and 7-Zr are $\eta^5$. Assignments from the literature place the threshold for zirconium-carbon bonding between 2.65 and 2.81 Å (Kowala et al., J. Chem. Soc. Chem. Comm. vol. 23, pp 993–994, 1974; Resconi et al., Organometallics vol. 15, pp 998–1005, 1996). For example, the two "non-bonded" carbons in $(\eta^5\text{-}C_{13}H_9)(\eta^3\text{-}C_{13}H_9)ZrCl_2$ are 2.801 Å and 2.807 Å from the metal while the remaining eight "bonded" carbons are between 2.395 Å and 2.645 Å away (Kowala et al., Acta Cryst. B32, pp 820–823, 1976). In $Re(\eta^1\text{-}C_{13}H_9)(CO)_5$ the bonded carbon is 2.307 Å from rhenium while the four unequivocally non-bonded carbons are between 3.193 Å and 4.149 Å from the metal (Mejdrich et al., Synth. React. Inorg. Met.-Org. Chem. vol. 28, pp 953–973, 1998). In structures 2-Zr, 3-Zr, 3-Hf, and 5-Zr, the bonded carbon is between 2.281 Å and 2.330 Å from the metal. Each structure has one metal-carbon interatomic distance between 2.731 Å and 2.847 Å, which is at the upper limit of the bonding range. The remaining three distances for each structure are at least 3.130 Å, considerably beyond normal zirconium-carbon or hafnium-carbon bond lengths.

Figure 10:
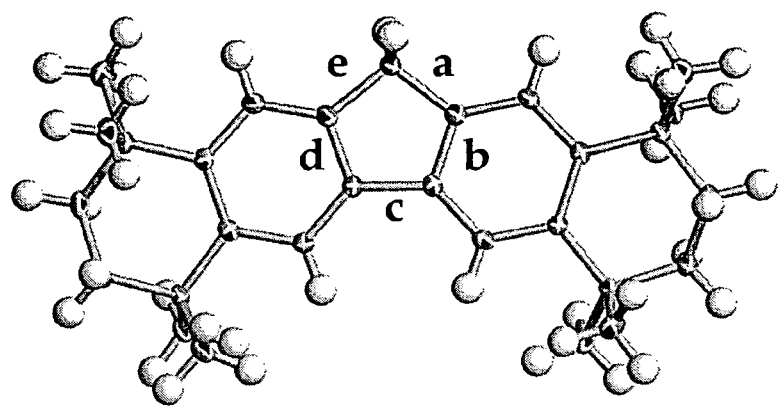
FIG. 10 illustrates that the bond length difference parameter δ is 0.114 Å for octamethyloctahydrodibenzofluorene and is predicted to decrease with increasing hapticity.

An alternative method for assessing hapticity is by measurement of the carbon-carbon bond lengths of the five-membered ring. In octamethyloctahydrodibenzofluorene, long bonds are found connecting the $sp^3$ carbon to the aromatic rings (1.515 Å) and short bonds are found as part of the aromatic rings (1.401 Å) (Irwin et al., J. Am. Chem. Soc. vol. 126, pp 16716–16717, 2004). The parameter δ can be defined as the difference between these bond lengths—or average difference for non-symmetrical species—as defined in FIG. 10, where the bond length difference parameter δ is 0.114 Å for octamethyloctahydrodibenzofluorene and is predicted to decrease with increasing hapticity. Table 5 lists carbon-carbon bond lengths and the calculated parameter δ for a variety of fluorenyl- and Oct-containing compounds. The entries are listed in order of decreasing δ, which corresponds to increasing hapticity since the carbon-carbon bond lengths are predicted to become more similar as an $\eta^5$, aromatic cyclopentadienide core is approached.

TABLE 5

Carbon-carbon bond lengths of the fluorenyl or Oct five-membered ring along with the bond length difference parameter
$\delta = (a + e - b - d)/2$ in Å.

| Compound | a | b | c | d | e | δ | Ref.[a] |
|---|---|---|---|---|---|---|---|
| OctH ($C_{29}H_{38}$) | 1.515(2) | 1.401(2) | 1.471(2) | 1.401(2) | 1.515(2) | 0.114 | [1] |
| fluorene ($C_{13}H_{10}$) | 1.504(2) | 1.397(2) | 1.472(3) | 1.397(2) | 1.504(2) | 0.107 | [2] |
| $Re(\eta^1\text{-}C_{13}H_9)(CO)_5$ | 1.506 | 1.405 | 1.451 | 1.417 | 1.505 | 0.095 | [3] |
| $(\eta^5\text{-}C_5H_4Me)_2Zr(\eta^1\text{-}C_{13}H_9)Cl$ | 1.505(5) | 1.415(5) | 1.461(5) | 1.405(5) | 1.477(5) | 0.081 | [4] |
| $Me_2C(\eta^5\text{-}C_5H_4)(\eta^1\text{-}C_{13}H_8)TaMe_3$ | 1.502(4) | 1.417(5) | 1.448(4) | 1.417(4) | 1.493(4) | 0.081 | [5] |
| 3-Hf ($Br_2 \cdot Et_2O$) | 1.485(10) | 1.410(10) | 1.479(11) | 1.409(10) | 1.472(12) | 0.069 | [6] |
| 3-Zr ($Br_2 \cdot Et_2O$) | 1.474(11) | 1.439(10) | 1.449(11) | 1.383(11) | 1.479(12) | 0.066 | [6] |
| 5-Zr ($Me_2 \cdot THF$) | 1.459(8) | 1.428(7) | 1.445(8) | 1.417(8) | 1.480(7) | 0.047 | [6] |
| $Mo(\eta^3\text{-}C_{13}H_9)(\eta^3\text{-}C_3H_5)_3$ | 1.476(3) | 1.407(3) | 1.465(4) | 1.433(3) | 1.458(3) | 0.047 | [7] |
| $Me_2Si(\eta^5\text{-}3,6\text{-}^tBu_2\text{-}C_{13}H_6)(\eta^1\text{-}N\text{-}^tBu)ZrCl_2$ | 1.46(1) | 1.43(1) | 1.46(1) | 1.42(1) | 1.45(1) | 0.030 | [8] |
| 6-Zr (($CH_2Ph)_2$) | 1.455(3) | 1.426(3) | 1.447(3) | 1.430(3) | 1.459(3) | 0.029 | [6] |
| 7-Zr (($CH_2SiMe_3)_2$) | 1.453(3) | 1.426(3) | 1.454(3) | 1.421(3) | 1.448(3) | 0.027 | [6] |
| 6-Hf (($CH_2Ph)_2$) | 1.454(14) | 1.416(12) | 1.447(14) | 1.445(14) | 1.459(13) | 0.026 | [6] |
| $(\eta^5\text{-}C_{13}H_9)(\eta^3\text{-}C_{13}H_9)ZrCl_2$ | 1.50 | 1.41 | 1.47 | 1.43 | 1.39 | 0.025 | [9] |
| 2-Zr ($Cl_2 \cdot Et_2O$) | 1.468(9) | 1.431(8) | 1.434(8) | 1.437(9) | 1.441(9) | 0.021 | [1] |
| $Me_2Si(\eta^5\text{-}C_{13}H_8)(\eta^1\text{-}N\text{-}^tBu)Zr(CH_2SiMe_3)_2$ | 1.450(4) | 1.426(4) | 1.442(4) | 1.431(4) | 1.442(4) | 0.018 | [10] |

TABLE 5-continued

Carbon-carbon bond lengths of the fluorenyl or Oct five-membered ring along with the bond length difference parameter
$\delta = (a + e - b - d)/2$ in Å.

| Compound | a | b | c | d | e | δ | Ref.[a] |
|---|---|---|---|---|---|---|---|
| $Me_2C(\eta^5-C_5H_4)(\eta^5-C_{29}H_{36})ZrCl_2$ | 1.449(5) | 1.431(5) | 1.434(5) | 1.440(5) | 1.443(5) | 0.011 | [11] |
| $Ph_2C(\eta^5-C_5H_4)(\eta^5-C_{29}H_{36})ZrCl_2$ | 1.457(6) | 1.430(6) | 1.443(6) | 1.458(6) | 1.447(6) | 0.008 | [12] |
| $(\eta^5-C_{13}H_9)(\eta^3-C_{13}H_9)ZrCl_2$ | 1.44 | 1.42 | 1.44 | 1.44 | 1.43 | 0.005 | [9] |
| $Me_2C(\eta^5-C_5H_4)(\eta^5-C_{13}H_8)ZrCl_2$ | 1.45(1) | 1.44(1) | 1.43(1) | 1.44(1) | 1.43(1) | 0.000 | [13] |
| $fluorenylLi(Et_2O)_2$ | 1.424(4) | 1.443(4) | 1.434(4) | 1.443(5) | 1.426(5) | −0.018 | [14] |

[a]References: [1] Irwin et al., J. Am. Chem. Soc. 126 (2004) 16716–16717; [2] Gerkin et al., Acta Cryst. C40 (1984) 1892–1894; [3] Mejdrich et al., Synth. React. Inorg. Met.-Org. Chem. 28 (1998) 953–973; [4] Schmid et al., J. Organomet. Chem. 541 (1997) 3–7; [5] P. J. Chirik, Ph.D. Thesis, California Institute of Technology, 2000; [6] Irwin et al., Polyhedron, 24 (2005) pp. 1314–1324; [7] Andell et al., Polyhedron 8 (1989) 203–209; [8] Razavi et al., J. Organomet. Chem. 621 (2001) 267–276; [9] Kowala et al., Acta Cryst. B32 (1976) 820–823; [10] Okuda et al., Organometallics 14 (1995) 789–795; [11] Irwin et al., unpublished results; [12] Miller et al., Organometallics 23 (2004) 1777–1789; [13] Razavi et al., J. Organomet. Chem. 435 (1992) 299–310; [14] Hakansson et al., Organometallics 17 (1998) 1208–1214.

The largest value of δ (0.095 Å) is found for $Re(\eta^1-C_{13}H_9)(CO)_5$, an electronically (18 e⁻) and coordinatively (octahedral) saturated compound that cannot increase its $\eta^1$ hapticity with the fluorenyl ligand. Although $(\eta^5-C_5H_4Me)_2Zr(\eta^1-C_{13}H_9)Cl$ and $Me_2C(\eta^5-C_5H_4)(\eta^1-C_{13}H_8)TaMe_3$ are not electronically saturated, sterics probably dissuade a greater hapticity, resulting in a high δ value (0.081 for both). The next three species are 3-Hf, 3-Zr, and 5-Zr, which have δ values of 0.069 Å, 0.066 Å, and 0.047 Å, respectively, which still indicate significant carbon-carbon bond length differences. This last value is also found for a complex reported as $\eta^3$, $Mo(\eta^3-C_{13}H_9)(\eta^3-C_3H_5)_3$. The remaining twelve compounds, including 6-Zr, 7-Zr, and 6-Hf, have δ values of 0.030 Å or less and are predicted to be $\eta^5$. Three anomalies exist in this range: $(\eta^5-C_{13}H_9)(\eta^3-C_{13}H_9)ZrCl_2$ (δ=0.025), which is reported as $\Theta^3$; 2-Zr (δ=0.021), which is reported as $\eta^1$; and $fluorenylLi(Et_2O)_2$ (δ=−0.018), which is reported as $\eta^2$. It should be noted that δ is an indirect measure of hapticity. It only measures carbon-carbon bond length distortions that occur in response to a metal's location and bonding. Thus, δ and hapticity are reasonably correlative, but the exceptions remind us that hapticity is best determined by measuring metal-carbon interatomic distances.

EXAMPLE 7

This Example is illustrative of hapticity analysis of Zr complexes in solution by NMR.

The solution ¹H NMR spectra of the diethyl ether complexes of 2-Zr, 2-Hf, 3-Zr, 3-Hf, 4-Zr, and 4-Hf show sharp resonances for the ethereal protons, a trait usually attributed to unbound ether species. This suggests solution species with $\eta^5$-Oct ligation. The THF adducts, however, provide somewhat broad resonances for the ethereal protons, indicating that THF coordination and low Oct hapticity are maintained in solution. Careful inspection of the ¹H and ¹³C NMR chemical shifts of compounds 2-Zr through 7-Zr indeed reveals unusual chemical shifts for only the THF adduct 5-Zr (Table 6). The aromatic C—H protons in the 1 and 4 positions of the Oct moiety are the most upfield of this group at 7.82 and 8.15 ppm. The M-C(1) carbon is the most downfield (86.3 ppm) and, of the aromatic carbons, two have comparatively high chemical shifts (133.6, 137.6 ppm) and four have comparatively low chemical shifts (117.4, 118.5, 139.7, 141.9 ppm). These unusual chemical shifts for 5-Zr are mirrored in $Me_2Si(\eta^1-C_{29}H_{36})(\eta^1-N-^tBu)ZrCl_2\cdot THF$ and $Me_2Si(\eta^1-C_{29}H_{36})(\eta^1-N-^tBu)ZrBr_2\cdot NCMe$ (see Table 6), suggesting that each of these also maintains $\eta^1$-Oct ligation in solution.

TABLE 6

Selected ¹H NMR and ¹³C NMR chemical shifts (ppm) for Oct-Zr species: aromatic C-H in the 1 and 4 positions; M-C(1); and aromatic C (in $C_6D_6$ except 7-Zr, recorded in $CDCl_3$).

| Compound | H | H | C(1) | C | C | C | C | C | C | Ref. |
|---|---|---|---|---|---|---|---|---|---|---|
| OctH ($C_{29}H_{38}$) | 7.46 | 7.98 | 36.5 | 117.5 | 123.3 | 140.3 | 141.4 | 143.4 | 143.6 | [6] |
| 2-Zr ($Cl_2\cdot Et_2O$) | 8.01 | 8.24 | 71.9 | 121.5 | 123.2 | 125.3 | 134.8 | 145.6 | 148.9 | [1] |
| 3-Zr ($Br_2\cdot Et_2O$) | 8.01 | 8.27 | 72.0 | 122.0 | 124.0 | 126.0 | 134.6 | 146.0 | 148.8 | [6] |
| 4-Zr ($Me_2\cdot Et_2O$) | 7.93 | 8.23 | 70.8 | 120.6 | 122.7 | 123.7 | 135.0 | 142.6 | 146.7 | [6] |
| 5-Zr ($Me_2\cdot THF$) | 7.82 | 8.15 | 86.3 | 117.4 | 118.5 | 133.6 | 137.6 | 139.7 | 141.9 | [6] |
| 6-Zr (($CH_2Ph)_2$) | 8.15 | 8.16 | 73.9 | 120.1 | 122.0 | 122.7 | 134.1 | 145.7 | 147.0 | [6] |
| 7-Zr (($CH_2SiMe_3)_2$) | 7.92 | 8.17 | 71.1 | 120.1 | 122.5 | 123.2 | 133.9 | 142.7 | 146.1 | [6] |
| $Me_2Si(\eta^1-C_{29}H_{36})(\eta^1-N-^tBu)ZrCl_2\cdot THF$ | 7.94 | 8.02 | 96.5 | 117.6 | 119.1 | 135.8 | 138.7 | 139.7 | 143.0 | [6] |
| $Me_2Si(\eta^1-C_{29}H_{36})(\eta^1-N-^tBu)ZrBr_2\cdot NCMe$ | 8.03 | 8.03 | 93.0 | 117.0 | 121.2 | 134.6 | 139.6 | 141.4 | 142.8 | [6] |

[a]References: [1] Irwin et al., J. Am. Chem. Soc. 126 (2004) 16716–16717; [6] Irwin et al., Polyhedron 24 (2005) pp. __.

Thus, at least in some embodiments, in an effort to formulate better catalyst systems for the polymerization of olefins, a series of sterically expanded ansa-fluorenyl-amido zirconium and hafnium complexes with the general formula Me$_2$Si($\eta^n$-C$_{29}$H$_{36}$)($\eta^1$-N-$^t$Bu)MX$_2$.L$_m$ (n typically being 1 or 5) has been synthesized and characterized. Incorporation of the octamethyloctahydrodibenzofluorenyl (Oct) ligand effected ethereal binding in the solid-state when the remaining ligands were small (X=Cl, Br, or Me). Ether-free species were observed when larger ligands (X=benzyl or trimethylsilylmethyl) were present. X-ray crystallography established that an unusual trigonal bipyramidal $\eta^1$-Oct structure accompanied ethereal binding (n=1, m=1), while the ether-free species adopted the anticipated pseudotetrahedral $\eta^5$-Oct structure (n=5, m=0). The hapticity assignments were made largely by analyzing the relevant metal-carbon distances, but a correlation between hapticity and converging carbon-carbon bond lengths of the five-membered ring was also identified.

All patents and publications referenced herein are hereby incorporated by reference. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention as defined by the appended claims.

What is claimed is:

1. An organometallic complex having the formula: R$_2$Si($\eta^n$-C$_{29}$H$_{36}$)($\eta^1$-N—R')M'X$_2$.L, where (a) R is selected from the group consisting of alkyl groups, aryl groups, and combinations thereof; (b) n is selected from the group consisting of 1 and 5; (c) R' is selected from the group consisting of alkyl groups, aryl groups and combinations thereof; (d) M' is a transition metal; (e) X is selected from the group consisting of halides, alkyl groups, aryl groups, and combinations thereof; (f) L is an optional adduct; and (g) $\eta^n$-C$_{29}$H$_{36}$ is octamethyloctahydrodibenzofluorenylidene.

2. The organometallic complex of claim 1, wherein M' is selected from the group consisting of Zr, Hf, and Ti.

3. The organometallic complex of claim 1, wherein X is selected from the group consisting of F, Cl, Br, I, and combinations thereof.

4. The organometallic complex of claim 1, wherein R is a methyl (Me) group.

5. The organometallic complex of claim 1, wherein R' is a tert-butyl ($^t$Bu) group.

6. The organometallic complex of claim 1, wherein L is an ether.

7. The organometallic complex of claim 1, wherein L is selected from the group consisting of Et$_2$O, THF, and CH$_3$CN.

8. The organometallic complex of claim 1, wherein the organometallic complex is a trigonal bipyramidal species having a formula selected from the group consisting of Me$_2$Si($\eta^1$-C$_{29}$H$_{36}$)($\eta^1$-N-$^t$Bu)ZrBr$_2$.OEt$_2$, Me$_2$Si($\eta^1$-C$_{29}$H$_{36}$)($\eta^1$-N-$^t$Bu)ZrCl$_2$.OEt$_2$, Me$_2$Si($\eta^1$-C$_{29}$H$_{36}$)($\eta^1$-N-$^t$Bu)HfBr$_2$.OEt$_2$, and Me$_2$Si($\eta^1$-C$_{29}$H$_{36}$)($\eta^1$-N-$^t$Bu)ZrMe$_2$.THF.

9. A method for olefin polymerization comprising a step of catalyzing said polymerization using the organometallic complex of claim 1.

10. The method of claim 9, wherein the organometallic serves as a precatalyst for olefin polymerization.

11. A catalyst system comprising:
   (a) a quantity of the organometallic complex of claim 1; and
   (b) a co-catalyst.

12. The catalyst system of claim 11, wherein the co-catalyst is selected from the group consisting of alkylaluminoxanes, boron-based Lewis acids, borate-based salts, amine salts, and combinations thereof.

13. The catalyst system of claim 11, wherein the co-catalyst is selected from the group consisting of MAO (methylaluminoxane), B(C$_6$F$_5$)$_3$, (C$_6$H$_5$)$_3$C$^+$B(C$_6$F$_5$)$_4^-$, HMe$^2$N(C$_6$H$_5$)$^{30}$ B(C$_6$F$_5$)$_4^-$, and combinations thereof.

14. A method for olefin polymerization comprising a step of contacting propylene with the catalyst system of claim 11, to form syndiotactic polypropylene, wherein said syndiotactic polypropylene has an un-annealed melting temperature above 157° C.

15. A method for olefin polymerization comprising a step of contacting monomer with the catalyst system of claim 11, to form a homopolymer, wherein said monomer is selected from the group consisting of ethylene, propylene, 1-butene, 4-methyl-1-pentene, 1-hexene, and 1-octene.

16. A method for olefin polymerization comprising a step of contacting monomers with the catalyst system of claim 11, to form a copolymer, monomers are selected from the group consisting of ethylene, propylene, 1-butene, 4-methyl-1-pentene, 1-hexene, and 1-octene.

17. A method for olefin polymerization comprising a step of contacting monomers with the catalyst system of claim 11, to form a terpolymer, wherein said monomers are selected from the group consisting of ethylene, propylene, 1-butene, 4-methyl-1-pentene, 1-hexene, and 1-octene.

18. A method for olefin polymerization comprising a step of contacting ethylene with the catalyst system of claim 11, to form a polymer, wherein said polymer comprises branches selected from the group consisting of long-chain branches, short-chain branches, and combinations thereof.

19. The method of claim 16, wherein said copolymer comprises branches selected from the group consisting of long-chain branches, short-chain branches, and combinations thereof.

20. The method of claim 17, wherein said terpolymer comprises branches selected from the group consisting of long-chain branches, short-chain branches, and combinations thereof.

21. A method for making the organometallic complex of claim 1, the method comprising the steps of:
   (a) forming an OctM (C$_{29}$H$_{37}$M) species generated from C29H38 (octamethyloctahydrodibenzofluorene) and an alkali alkyl species, where M is an alkali metal;
   (b) combining a hydrocarbon-based slurry of OctM with an excess of a Cl$_2$Si(R)$_2$ species to form a first reaction product, wherein R is selected from the group consisting of alkyl groups, aryl groups, and combinations thereof;
   (c) adding an metal alkyl amide species M"NHR' species to the first reaction product to form a second reaction product, wherein M" is an alkali metal and R' is selected from the group consisting of alkyl groups, aryl groups, and combinations thereof;

(d) adding an alkali alkyl species to the second reaction product to doubly deprotonate the second reaction product and form third reaction product, a dialkali salt; and (e) combining the dialkali salt with a M'X$_4$ species and reacting in the presence of a species L to form a product R$_2$Si($\eta''$-C$_{29}$H$_{36}$)($\eta^1$-N—R')M'X$_2$.L; wherein M' is a transition metal; X is selected from the group consisting of halides, alkyl groups, aryl groups, and combinations thereof; and L is an optional adduct in the product.

22. The method of claim 21, wherein the alkali alkyl species is selected from the group consisting of alkyllithium species, alkylsodium species, alkylpotassium species, and combinations thereof.

23. The method of claim 21, wherein the alkali alkyl species is n-butyllithium.

24. The method of claim 21, wherein the hydrocarbon-based slurry comprises an ethereal solvent.

25. The method of claim 21, wherein OctM is OctLi.

26. The method of claim 21, wherein the Cl$_2$Si(R)$_2$ species is dichlorodimethylsilane (Cl$_2$Si(CH$_3$)$_2$).

27. The method of claim 21, wherein the metal alkyl amide species M"NHR' species is lithium tert-butyl amide (LiNHC(CH$_3$)$_3$).

28. The method of claim 21, wherein the dialkali salt is LiNC(CH$_3$)$_3$Si(CH$_3$)$_2$(C$_{29}$H$_{36}$Li).

29. The method of claim 21, wherein L is Et$_2$.

30. The method of claim 21, further comprising a step of reacting the product R$_2$Si($\eta''$-C$_{29}$H$_{36}$)($\eta^1$-N—R') M'R"$_2$.L with a species M'"R' to form a variant product R$_2$Si ($\eta''$-C$_{29}$H$_{36}$)($\eta^1$—N—R') M'R"$_2$.L, where M'" is selected from the group consisting of an alkali metal and a magnesium halide, and R" is selected from the group consisting of an alkyl group differing from X and an aryl group differing from X.

31. Syndiotactic polypropylene made by the catalyst system of claim 11, wherein the syndiotactic polypropylene has an un-annealed melting temperature above 157° C.

32. The syndiotactic polypropylene of claim 31, wherein the stereochemical pentad fraction [rrrr] is greater than 99%.

* * * * *